United States Patent
Park

(10) Patent No.: US 12,218,766 B2
(45) Date of Patent: *Feb. 4, 2025

(54) METHODS FOR TRANSMITTING AND RECEIVING HYBRID AUTOMATIC RETRANSMIT REQUEST-ACKNOWLEDGMENT (HARQ-ACK) INDEX MAPPING AND UPLINK RESOURCE ALLOCATION FOR CHANNEL SELECTION TRANSMISSION IN INTER-BAND TIME DIVISION DUPLEX MODE, USER EQUIPMENT TO TRANSMIT HARQ-ACK, AND eNODE-B TO RECEIVE HARQ-ACK

(71) Applicant: PANTECH CORPORATION, Seoul (KR)

(72) Inventor: Dong Hyun Park, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,977

(22) Filed: Nov. 20, 2023

(65) Prior Publication Data
US 2024/0097832 A1    Mar. 21, 2024

Related U.S. Application Data

(63) Continuation of application No. 17/982,442, filed on Nov. 7, 2022, now Pat. No. 11,848,752, which is a (Continued)

(30) Foreign Application Priority Data

May 9, 2012  (KR) .......................... 10-2012-0049041
Aug. 1, 2012  (KR) .......................... 10-2012-0084459

(51) Int. Cl.
*H04W 4/00*  (2018.01)
*H04L 1/1812*  (2023.01)
(Continued)

(52) U.S. Cl.
CPC .......... *H04L 1/1861* (2013.01); *H04L 1/1812* (2013.01); *H04L 5/001* (2013.01);
(Continued)

(58) Field of Classification Search
CPC ..... H04L 1/1861; H04L 1/1812; H04L 5/001; H04L 5/0055; H04L 5/1469;
(Continued)

(56) References Cited

U.S. PATENT DOCUMENTS 9,030,973 B2 *  5/2015  Park ...................... H04W 76/28
                                                              370/442
9,191,932 B2 *  11/2015  Park ...................... H04L 1/1861
(Continued)

*Primary Examiner* — Chuong T Ho
(74) *Attorney, Agent, or Firm* — WOMBLE BOND DICKINSON (US) LLP

(57) ABSTRACT

Hybrid Automatic Retransmit ReQuest-Acknowledgment (HARQ-ACK) index mapping and uplink resource allocation is performed and controlled for channel selection transmission. A method for transmitting HARQ-ACK information to an eNode-B (eNB) by a User Equipment (UE) includes identifying KPCell as a number of downlink subframe(s) of a PCell associated with an uplink subframe and identifying KSCell as a number of downlink subframe(s) of an SCell associated with the uplink subframe; generating Discontinuous Transmission (DTX) response information for a cell having a smaller number of downlink subframes between the PCell and the SCell; generating HARQ-ACK information including the generated DTX response information and response information on data received by the UE from the eNB; and transmitting the generated HARQ-ACK information to the eNB through the uplink subframe.

18 Claims, 20 Drawing Sheets

Related U.S. Application Data continuation of application No. 17/129,793, filed on Dec. 21, 2020, now Pat. No. 11,496,253, which is a continuation of application No. 16/227,369, filed on Dec. 20, 2018, now Pat. No. 10,873,426, which is a continuation of application No. 15/705,131, filed on Sep. 14, 2017, now abandoned, which is a continuation of application No. 15/173,139, filed on Jun. 3, 2016, now Pat. No. 9,794,029, which is a continuation of application No. 14/942,519, filed on Nov. 16, 2015, now Pat. No. 9,363,801, which is a continuation of application No. 14/707,736, filed on May 8, 2015, now Pat. No. 9,191,932, which is a continuation of application No. 13/888,891, filed on May 7, 2013, now Pat. No. 9,030,973.

(51) Int. Cl.
  *H04L 1/1829* (2023.01)
  *H04L 5/00* (2006.01)
  *H04L 5/14* (2006.01)
  *H04W 72/0446* (2023.01)
  *H04W 72/20* (2023.01)
  *H04W 76/28* (2018.01)

(52) U.S. Cl.
  CPC .......... *H04L 5/0055* (2013.01); *H04L 5/1469* (2013.01); *H04W 72/0446* (2013.01); *H04W 72/20* (2023.01); *H04W 76/28* (2018.02)

(58) Field of Classification Search
  CPC   H04L 5/0053; H04W 72/0446; H04W 72/20; H04W 76/28; H04W 72/21
  USPC ........................................ 370/329, 330, 328
  See application file for complete search history.

(56) References Cited

U.S. PATENT DOCUMENTS

| | | | | |
|---|---|---|---|---|
| 9,363,801 | B2* | 6/2016 | Park | H04L 5/0055 |
| 9,794,029 | B2* | 10/2017 | Park | H04L 5/0055 |
| 10,873,426 | B2* | 12/2020 | Park | H04L 5/0055 |
| 11,496,253 | B2* | 11/2022 | Park | H04L 5/0055 |
| 11,848,752 | B2* | 12/2023 | Park | H04W 72/20 |
| 2012/0269103 | A1* | 10/2012 | Papasakellariou | H04L 1/1861 370/280 |
| 2013/0223295 | A1* | 8/2013 | Choi | H04W 72/20 370/280 |
| 2013/0265914 | A1* | 10/2013 | Ahn | H04L 5/14 370/280 |
| 2014/0022967 | A1* | 1/2014 | Yang | H04L 5/0055 370/280 |
| 2014/0056184 | A1* | 2/2014 | Yang | H04L 1/1861 370/280 |
| 2014/0126433 | A1* | 5/2014 | Yang | H04L 1/0027 370/280 |
| 2014/0169242 | A1* | 6/2014 | Yang | H04L 1/1893 370/280 |
| 2014/0192688 | A1* | 7/2014 | Yang | H04L 5/0055 370/280 |

\* cited by examiner

METHODS FOR TRANSMITTING AND RECEIVING HYBRID AUTOMATIC RETRANSMIT REQUEST-ACKNOWLEDGMENT (HARQ-ACK) INDEX MAPPING AND UPLINK RESOURCE ALLOCATION FOR CHANNEL SELECTION TRANSMISSION IN INTER-BAND TIME DIVISION DUPLEX MODE, USER EQUIPMENT TO TRANSMIT HARQ-ACK, AND eNODE-B TO RECEIVE HARQ-ACK

CROSS-REFERENCE TO RELATED APPLICATIONS

This application is a continuation of U.S. patent application Ser. No. 17/982,442, filed on Nov. 7, 2022, which is a continuation of U.S. patent application Ser. No. 17/129,793, filed on Dec. 21, 2020, issued as U.S. Pat. No. 11,496,253, dated Nov. 8, 2022, which is a continuation of U.S. patent application Ser. No. 16/227,369, filed on Dec. 20, 2018, issued as U.S. Pat. No. 10,873,426, dated Dec. 22, 2020, which is a continuation of U.S. patent application Ser. No. 15/705,131, filed on Sep. 14, 2017, which is a continuation of U.S. patent application Ser. No. 15/173,139, filed on Jun. 3, 2016, issued as U.S. Pat. No. 9,794,029, dated Oct. 17, 2017, which is a continuation of U.S. patent application Ser. No. 14/942,519, filed on Nov. 16, 2015, issued as U.S. Pat. No. 9,363,801, dated Jun. 7, 2016, which is a continuation of U.S. patent application Ser. No. 14/707,736, filed on May 8, 2015, issued as U.S. Pat. No. 9,191,932, dated Nov. 17, 2015, which is a continuation of U.S. patent application Ser. No. 13/888,891, filed on May 7, 2013, issued as U.S. Pat. No. 9,030,973, dated May 12, 2015, and claims priority from and the benefit under 35 U.S.C. § 119 (a) of Korean Patent Application Nos. 10-2012-0049041, filed on May 9, 2012, and 10-2012-0084459, filed on Aug. 1, 2012, the entire disclosures of which are hereby incorporated by reference for all purposes as if fully set forth herein.

BACKGROUND

Field

The present disclosure relates to a method and an apparatus for controlling HARQ-ACK index mapping and uplink resource allocation for channel selection transmission in an inter-band Time Division Duplex (TDD) Mode. That is, the present disclosure relates to a method of mapping HARQ-ACK indexes, and transmitting Physical Uplink Control CHannel (PUCCH) ACK/NACK (A/N) in a state where TDD transmission modes between bands are different and scheduling between subcarriers is set, and apparatuses for implementing the method, and may overcome limitations in transmission/reception subframes.

Discussion of the Background

As communication systems have developed, various wireless terminals have been utilized by consumers, such as, enterprises and individuals. A current mobile communication system, for example, 3GPP, Long Term Evolution (LTE), LTE-Advanced (LTE-A), and the like, may be a high capacity communication system capable of transmitting and receiving various data, such as, image data, wireless data and the like, beyond providing a sound-based service. Accordingly, there is a desire for a technology that transmits high capacity data comparable with a wired communication network. Large capacity data can be efficiently transmitted through a plurality of Component Carriers (CCs). Meanwhile, in a Time Division Duplex (TDD) system, Transmission (Tx) and Reception (Rx) are performed using particular frequency bands, and data can be transmitted and received based on divided time slots.

According to a channel selection and PUCCH format 3 transmission method in conventional (Release-10 (Rel-10)) Carrier Aggregation (CA) TDD, it is assumed that the number of Downlink (DL) subframes associated with PCell Uplink (UL) subframes are always the same, because Rel-10 CA TDD defines that all serving cells have the same TDD UL-DL configuration. However, in Rel-11 in which different TDDs configurations are made in different carriers, additional handling is used to support the Physical Uplink Control CHannel (PUCCH) transmission method. Accordingly, the present teachings disclose an additional handling method, which may solve errors in the PUCCH transmission method that are generated in such an environment.

That is, a method for solving problems of the conventional Rel-10 channel selection transmission method generated by different PDSCH HARQ timings between a PCell and an SCell and improving the Rel-10 channel selection transmission method is needed.

SUMMARY

Exemplary embodiments of the present invention provide a method for transmitting HARQ-ACK information to an eNode-B (eNB) by a User Equipment, a method for receiving HARQ-ACK information from a UE by an eNB, a LTE to transmit HARQ-ACK information to an eNB, and an eNB to receive HARQ-ACK information from a UE.

Additional features of the invention will be set forth in the description which follows, and in part will be apparent from the description, or may be learned by practice of the invention.

An exemplary embodiment of the present invention discloses a method for transmitting Hybrid Automatic Retransmit Request-Acknowledgment (HARQ-ACK) information to an eNode-B (eNB) by a User Equipment (IX), the method including: identifying KPCell as a number of downlink subframe(s) of a PCell associated with an uplink subframe, and identifying KSCell as a number of downlink subframe(s) of an SCell associated with the uplink subframe; generating Discontinuous Transmission (DTX) response information for a cell, among the PCell and the SCell, having a smaller number of downlink subframe between the PCell and the SCell using a difference between the KPCell and the KSCell, wherein the DTX response information includes DTX response(s), and the difference corresponds to a number of the DTX response(s); generating HARQ-ACK information including the generated DTX response information and response information on data received by the UE from the eNB; and transmitting the generated HARQ-ACK information to the eNB through the uplink subframe.

An exemplary embodiment of the present invention discloses a method of receiving Hybrid Automatic Retransmit Request-Acknowledgment (HARQ-ACK) information from a User Equipment (UE) by an eNode-B (eNB), the method including: receiving the HARQ-ACK information generated by the LTE through an uplink subframe; identifying KPCell as a number of downlink subframe(s) of a PCell associated with an uplink subframe, and identifying KSCell as a number of downlink subframe(s) of an SCell associated with the uplink subframe in the HARQ-ACK information; and identifying Discontinuous Transmission (DTX) response information for a cell, among the PCell and the SCell, having a smaller number of downlink subframe between the PCell and the SCell using a difference between the KPCell and the KSCell, wherein the DTX response information including DTX response(s), and the difference corresponds to a number of the DTX response(s).

An exemplary embodiment of the present invention discloses a User Equipment (UE) to transmit Hybrid Automatic Retransmit Request-Acknowledgment (HARQ-ACK) information to an eNode-B (eNB), the UE including: a controller, the controller to identify KPCell as a number of downlink subframe(s) of a PCell associated with an uplink subframe, to identify KSCell as a number of downlink subframe(s) of an SCell associated with the uplink subframe, to generate Discontinuous Transmission (DTX) response information for a cell, among the PCell and the SCell, having a smaller number of downlink subframe between the PCell and the SCell using a difference between the KPCell and the KSCell wherein the DTX response information includes DTX response(s), and the difference corresponds to a number of the DTX response(s), and to generate HARQ-ACK information including the generated DTX response information and response information on data received by the UE from the eNB; and a transmitter to transmit the generated HARQ-ACK information to the eNB through the uplink subframe.

An exemplary embodiment of the present invention discloses an eNode-B (eNB) to receive Hybrid Automatic Retransmit Request-Acknowledgment (HARQ-ACK) information from a User Equipment (UE), the eNB including: a receiver to receive the HARQ-ACK information generated by the UE through an uplink subframe; and a controller to identify KPCell as a number of downlink subframe(s) of a PCell associated with an uplink subframe, to identify KSCell as a number of downlink subframe(s) of an SCell associated with the uplink subframe in the HARQ-ACK information, and to identify Discontinuous Transmission (DTX) response information for a cell, among the PCell and the SCell, having a smaller number of downlink subframe between the PCell and the SCell using a difference between the KPCell and the KSCell, wherein the DTX response information includes DTX response(s), the difference corresponding to a number of DTX response(s).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
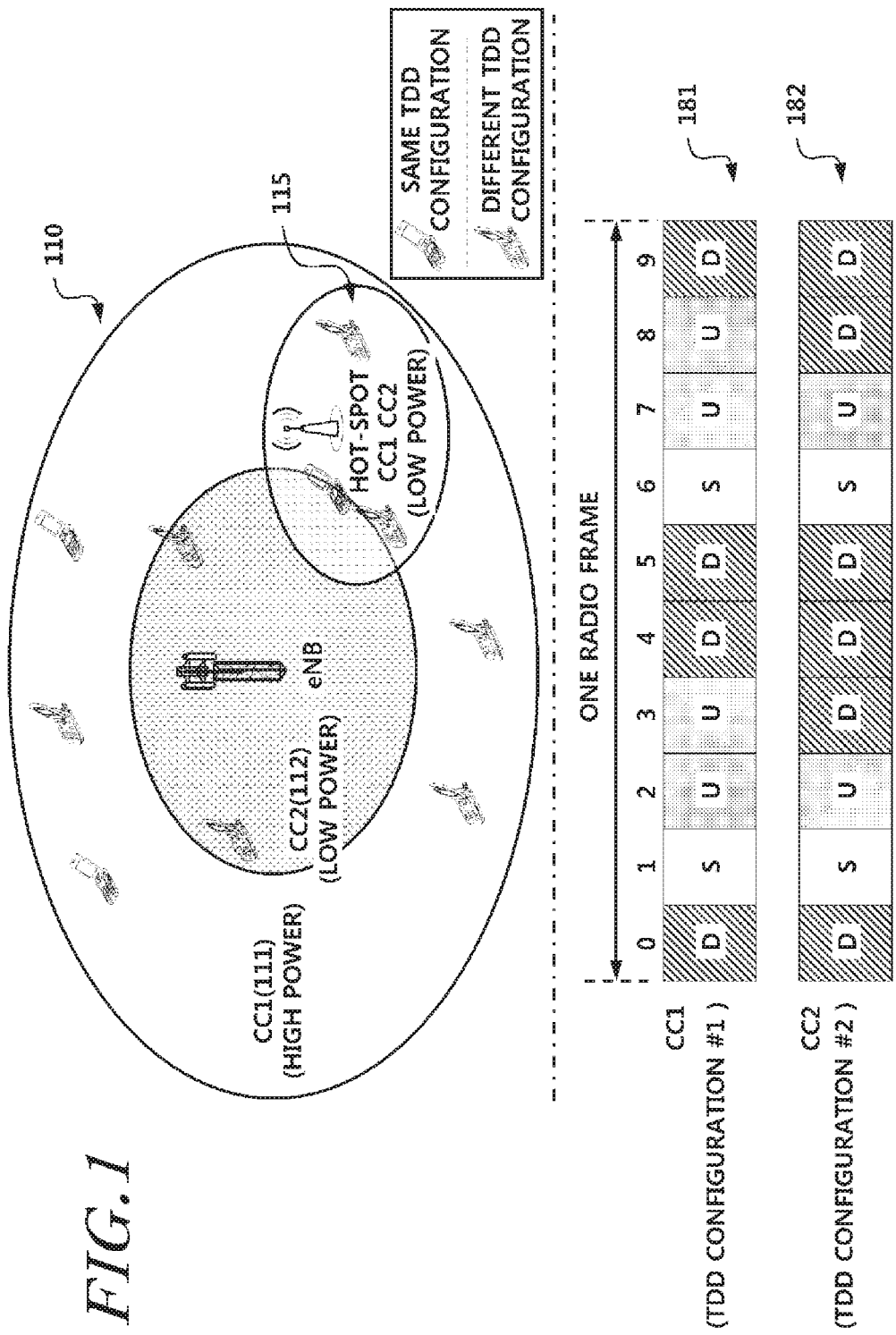
FIG. 1 is a diagram illustrating an inter-band CA environment according to exemplary embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

Additional features of the invention will be set forth in the description which follows, and in part will be apparent from the description, or may be learned by practice of the invention.

For the purposes of the present document, the following frequently used abbreviations apply.

ACK Acknowledgement
CCE Control Channel Element
CIF Carrier Indicator Field
DAI Downlink Assignment Index
DCI Downlink Control Information
DL Downlink
DTX Discontinuous Transmission
eNB evolved Node B/eNode-B
HARQ Hybrid Automatic Retransmit reQuest
HSPA High Speed Packet Access
LTE Long Term Evolution
NACK Negative Acknowledgement
PCell Primary Cell
PCFICH Physical Control Format Indicator Channel
PDCCH Physical Downlink Control Channel
PDSCH Physical Downlink Shared Channel
PHICH Physical Hybrid ARQ Indicator Channel
PUCCH Physical Uplink Control Channel
PUSCH Physical Uplink Shared Channel
RI Rank Indication
SCell Secondary Cell
SPS Semi-Persistent Scheduling
TDD Time Division Duplex
UE User Equipment
UL Uplink
UL-SCH Uplink Shared Channel
WCDMA Wideband Code Division Multiple Access A method for handling PUCCH transmission based on different PDSCH HARQ timings between serving cells when cross carrier scheduling is configured under inter-band CA is provided.

The PUCCH transmission efficiency may be improved by applying spatial bundling or time domain bundling appropriate for differently configured HARQ timings.

A wireless communication system may be installed to provide various communication services, such as, a voice service, packet data and the like. The wireless communication system includes a User Equipment (UE) and a Base Station (BS or eNB). Throughout the specification, the user equipment may be an inclusive concept indicating a user terminal utilized in wireless communication, and should be construed as a concept including all of a User Equipment (UE) in WCDMA, LTE, HSPA and the like, and a Mobile Station (MS), a User Terminal (UT), a Subscriber Station (SS), a wireless device and the like in GSM.

In general, the base station or a cell may refer to a fixed station communicating with the user equipment, and may also be referred to as another term, such as, a Node-B, an evolved Node-B (eNB), a sector, a site, a Base Transceiver System (BTS), an access point, a relay node or the like.

That is, throughout the specification, the BS or the cell may be construed as an inclusive concept indicating a partial area covered by a Base Station Controller (BSC) in CDMA, a Node B in WCDMA, an eNB or sector (site) in LTE and the like, and the concept may include various coverage areas, such as, a megacell, a macrocell, a microcell, a picocell, a femtocell, a communication range of a relay node and the like.

The UE and the BS are used as two inclusive transceiving subjects used to embody the teachings described in the specification, and may not be limited to a predetermined term or word. The UE and the BS are used as two (uplink and downlink) inclusive transceiving subjects used to embody the teachings described in the specification, and may not be limited to a predetermined term or word. Here, uplink (UL) refers to a connection used for sending or uploading data from the UE to the BS, and downlink (DL) refers to a connection for receiving data from the BS by the UE.

A multiple access scheme applied to the wireless communication system is not limited. The wireless communication system may utilize various multiple access schemes, such as, Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. Exemplary embodiments of the present invention may be applicable to resource allocation in an asynchronous wireless communication scheme that is advanced through GSM, WCDMA, HSPA, to be LTE and LTE-advanced, and may be applicable to resource allocation in a synchronous wireless communication scheme that is advanced through CDMA and CDMA-2000, to be UMB. Exemplary embodiments of the present invention may not be limited to a specific wireless communication, and may be applicable to all technical fields to which the technical idea of the present invention is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, a system, such as, LTE or LTE-A, configures uplink and downlink based on one carrier or a pair of carriers to establish the standard. The uplink and the downlink transmit control information through control channels, such as, a Physical Downlink Control Channel (PDCCH), a Physical Control Format Indicator Channel (PCFICH), a Physical Hybrid ARQ Indicator Channel (PHICH), a Physical Uplink Control Channel (PUCCH) and the like, and configures data channels, such as, a Physical Downlink Shared Channel (PDSCH) and a Physical Uplink Shared Channel (PUSCH) and the like to transmit the data.

Meanwhile, time points are different between the downlink and the uplink in TDD. When there are various TDD configurations, the time points may vary.

Table 1 below shows TDD configurations. It can be identified through Table 1 that the respective TDD configurations have different UL-DL subframe transmission timings.

TABLE 1

Uplink-downlink configurations

| Uplink-downlink Config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, an area indicated by D is the downlink and an area indicated by U is the uplink in a radio frame corresponding to ten subframes. S is a special subframe, which has a downlink-to-uplink switch-point periodicity.

Further, in TDD, downlink subframes associated with each uplink subframe according to the uplink-downlink configurations in Table 1 are as follows.

TABLE 2

Downlink association set index {k0, k1, . . . , kM − 1}

| UL-DL Config | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The uplink subframe associated with the downlink subframe varies depending on the UL-DL Config. For example, for the TD) UL-L Config 3, subframe 2 is the uplink subframe and is associated with the downlink subframe received before subframes 7, 6, and 11. ACK/NACK information on the downlink subframe received before the subframes 7, 6, and 11 can be transmitted in the uplink subframe 2.

Meanwhile, when one configuration of the TDD configurations is used, the UE can know in advance the subframe direction of the downlink and the uplink. This information allows the UE to pre-predict and then perform the operation.

Meanwhile, the TD) configurations may be different for each band. However, carriers included in bands having the differently configured TDD UL-DL configuration may be used by one UE.

FIG. 1 is a diagram illustrating an inter-band CA environment according to exemplary embodiments of the present invention. FIG. 1 shows different TDD configurations in CA for flexible traffic loading handling.

Reference numeral 110 indicates a configuration of two component carriers, wherein CC #1 111 is a carrier having a coverage of a signal transmitted from an eNB with high power, and CC #2 112 is a carrier having a coverage of a signal transmitted from the eNB with low power. CC #1 111 and CC #2 112 are included in different bands. A TDD configuration of CC #1 111 corresponds to 1, which is indicated by reference numeral 181, and a TDD configuration of CC #2 112 corresponds to 2, which is indicated by reference numeral 182. Meanwhile, a hot-spot area 115 consists of the CA environment including CC #1 111 and CC #2 112. Further, reference numeral 110 can configure the CA for UEs in the CC #2 coverage.

Here, the UE performing communication with the hot-spot 115 has different TDD configurations, such as, CC #1 111 and CC #2 112, and the uplink subframe and the downlink subframe may be differently configured for each component carrier in some subframes.

In this case, operation schemes are different for each subframe according to whether a transmission mode supportable by the UE is a half-duplex mode or a full duplex mode.

In order to avoid an interference issue with TDD systems, for example, TD-SCDMA, Mobile WiMAX and the like, coexisting in the same band, different TDD UL-DL configurations are required on the inter-band CA.

A TDD UL-DL configuration including many UL subframes can be induced on a low frequency band and the TDD UL-DL configuration including many DL subframes can be induced on a high frequency band. Such a configuration helps a coverage enhancement, and also influences peak throughput.

Figure 2:
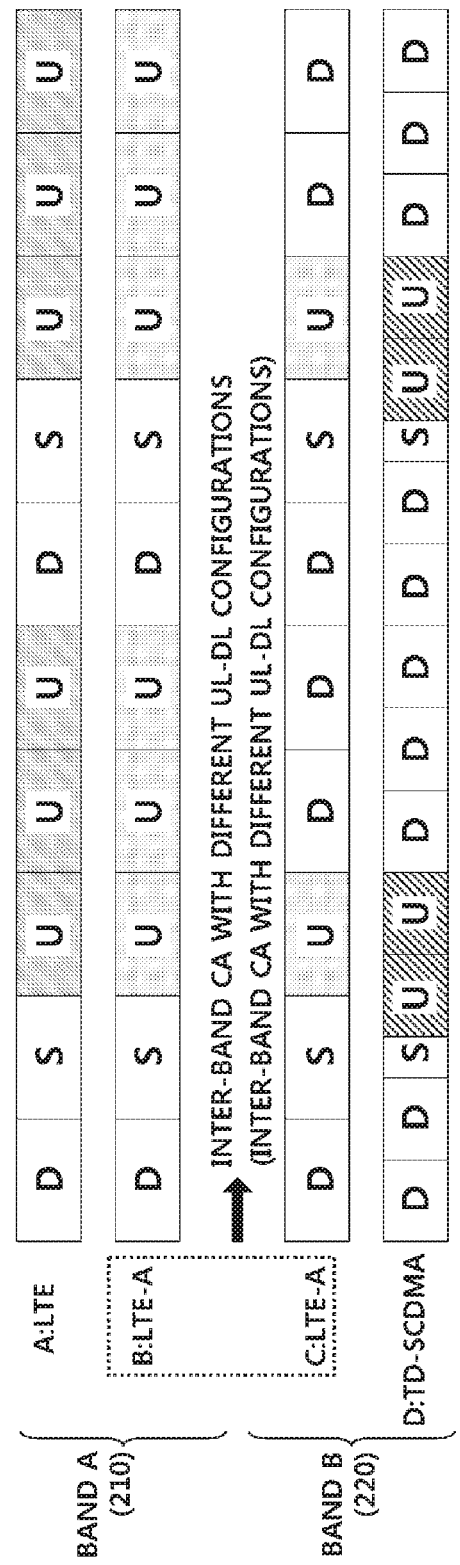
FIG. 2 is a diagram illustrating CA between bands having different TDD configurations according to exemplary embodiments of the present invention.

FIG. 2 is a diagram illustrating CA between bands having different TDD configurations according to exemplary embodiments of the present invention.

FIG. 2 shows different TDD UL-DL configurations on inter-band which can be used for a traffic adaptation.

Referring to FIG. 2, the TDD configurations are same or do not conflict, are made within a band A 210 and a band B 220. Accordingly, a component carrier A of the band A 210 is operated with TDD configuration #1 through the LTE scheme, and a component carrier B is operated with the TDD configuration #1 through the LTE-A scheme. Further, a component carrier C of the band B 220 is operated with TDD configuration #2 through the LTE-A scheme. Meanwhile, a component carrier D of the band B 220 is operated through the TD-SCDMA scheme. As such, in the same band, the same TDD UL-DL configuration is made or a TDD UL-DL configuration which does not allow confliction is made.

In a case of the UE having the CA of component carriers B and C, the TDD configurations are different (that is, the UE has the inter-band CA with different UL-DL configurations). According to whether the UE is in the half-duplex transmission mode or the full-duplex transmission mode, some subframes are muted or simultaneous transmission/reception (Tx/Rx) is performed as illustrated in FIG. 3 described below.

Figure 3:
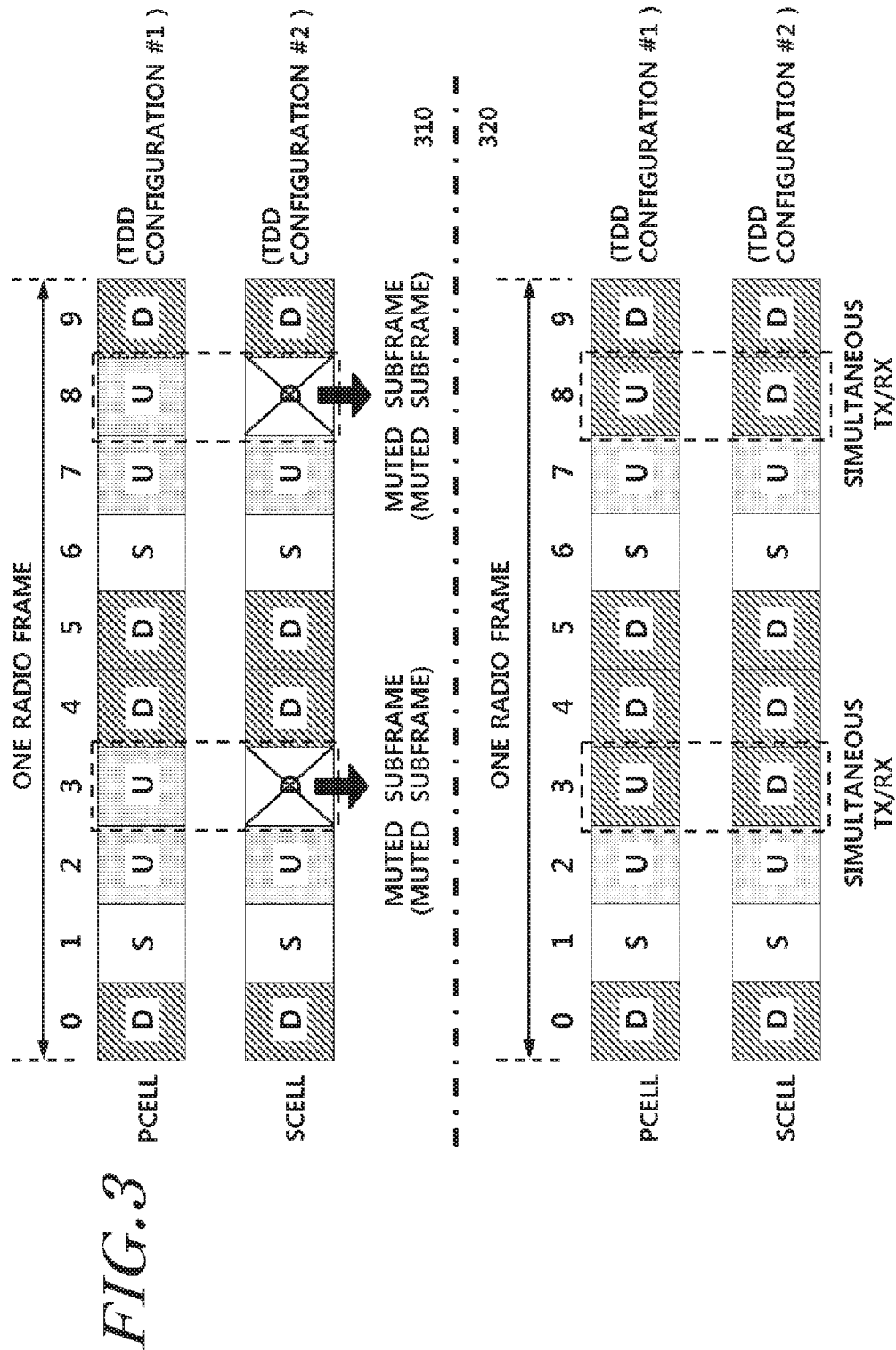
FIG. 3 is a diagram illustrating an operation scheme of each subframe based on a transmission mode of a UE under the inter-band CA environment according to exemplary embodiments of FIG. 1 and FIG. 2.

FIG. 3 is a diagram illustrating an operation scheme of each subframe according to a transmission mode of the UE under the inter-band CA environment according to exemplary embodiments of FIG. 1 and FIG. 2. CC #1 is a Primary Cell (PCell), and CC #2 is a Secondary Cell (SCell).

In reference numeral 310 of FIG. 3, when the UE supports only the half-duplex transmission mode, only the uplink subframes of the PCell operates and the downlink subframes of the SCell does not operate in subframes 3 and 8 of the radio frame, that is, subframes 3 and 8 of the SCell operate as muted subframes. In reference numeral 310, the half-duplex transmission mode is executed so that only the downlink or uplink is operated in one of subframes 3 and 8 in which the downlink and the uplink conflict.

On the other hand, in reference numeral 320, when the UE supports only the full-duplex transmission mode, both the uplink subframes of the PCell and the downlink subframes of the SCell are operated in subframes 3 and 8 of the radio frame. That is, the frill-duplex transmission mode can implement the uplink/downlink in each of the PCell and the SCell since transmission and reception can be simultaneously performed. In reference numeral 320, since the full-duplex transmission mode can be executed even in subframes 3 and 8 in which the downlink and the uplink conflict, both the downlink subframes and the uplink subframes can be operated.

In the configuration of FIG. 3, the UEs in the half-duplex transmission mode can use a reference TD) UL-DL configuration. That is, the UE can select (determine) information on a direction (uplink or downlink) to be selected on the conflicting subframe through information on the reference TDD UL-DL configuration. In this case, problems about Hybrid Automatic Retransmit reQuest (HARQ) timing, scheduling timing and the like are generated due to the different TDD UL-DL configurations.

Figure 4:
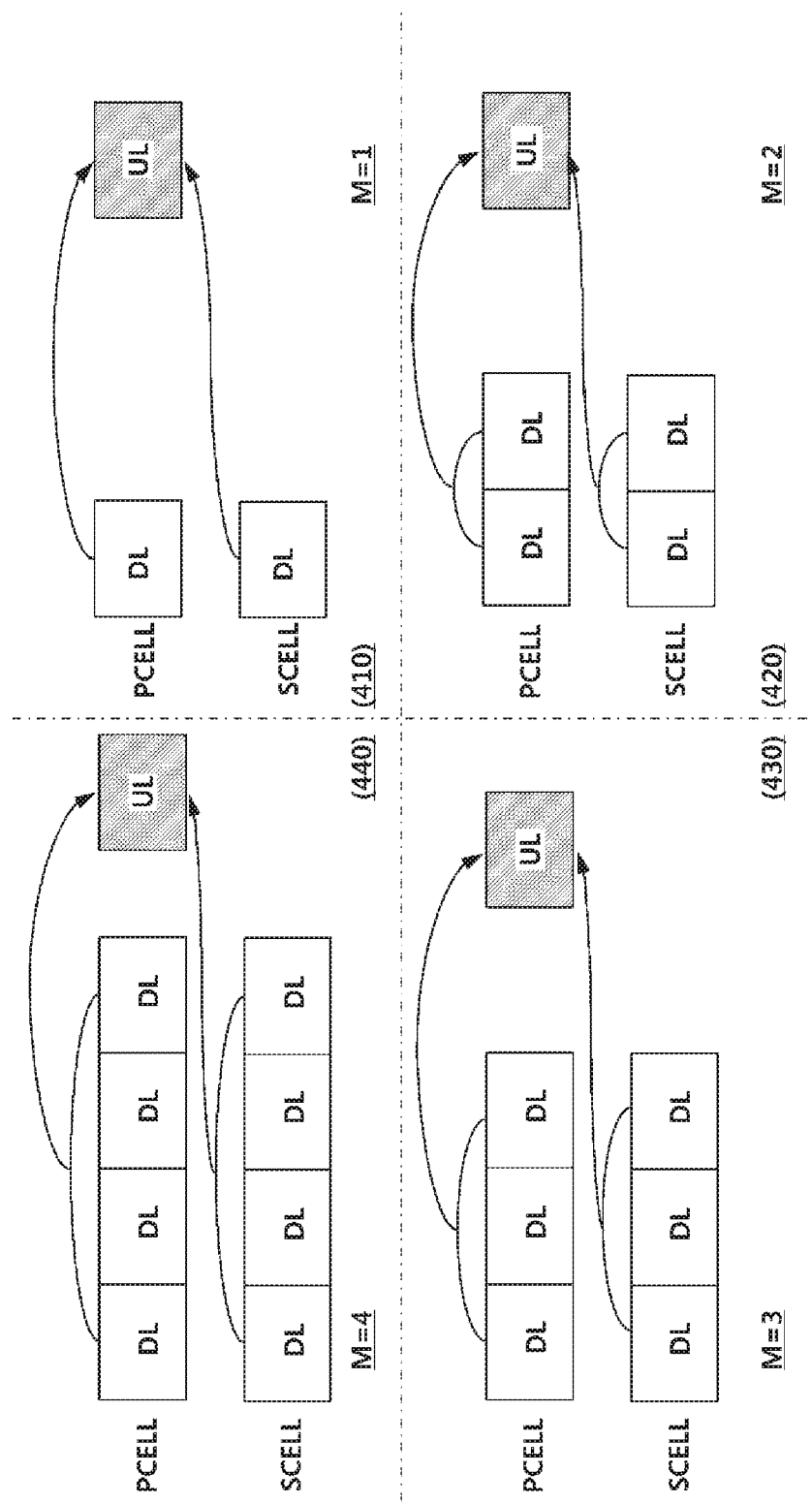
FIG. 4 is a diagram illustrating a PUCCH transmission method for channel selection transmission in CA-TDD according to exemplary embodiments of the present invention.

FIG. 4 is a diagram illustrating a PUCCH transmission method for channel selection transmission in CA-TDD according to exemplary embodiments of the present invention.

In FIG. 4, M refers to the number of downlink subframes associated with one uplink subframe. DL refers to a downlink subframe and UL refers to an uplink subframe in FIG. 4.

Reference numeral 410 shows a process of PUCCH transmission through an uplink subframe which is associated with each one downlink subframe in the PCell/SCell. The PCell/SCell means two configured CCs, but the present invention is not limited thereto.

A relation table employed in FDD is used. The following equation is applied.

$$A = \{2,3,4\}, 0 \leq j \leq A-1, \text{HARQ-ACK}(j) \quad (1)$$

In Equation (1), the A denotes the number of resources to be allocated for PUCCH transmission for a channel selection transmission method. According to A, respective transport block and serving cell to HARQ-ACK mapping can be applied as shown in Table 3.

TABLE 10.1.2.2.1-1

Mapping of Transport Block and Serving Cell to HARQ-ACK(j) for PUCCH format 1b HARQ-ACK channel selection

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

When A is 2, that is, when one CodeWord (CW) is transmitted in each of the PCell and the SCell, the number of required resources (A) is 2. As a result, the one CW delivered by the PCell is allocated to the HARQ-ACK(0), and the one CW delivered by the SCell is allocated to the HARQ-ACK(1) based on Table 3. Hereafter, each CW can be interpreted as a Transport Block.

Meanwhile, when A is 3, one CW is transmitted in either the PCell or the SCell, and two CWs are transmitted in the other cell. In this case, HARQ ACK information on the two CWs transmitted from the cell (cell 1) is indexed by HARQ-ACK(0) and HARQ-ACK(1), respectively, and HARQ ACK of the cell (cell 2) in which the one CW is transmitted is indexed by HARQ-ACK(2). For example, when the two CWs are transmitted in the PCell, the PCell becomes the cell 1 and the SCell becomes the cell 2.

When A is 4, that is, when two CWs are transmitted in each of the PCell and the SCell, the total number of desired resources (A) is 4. As a result, information on the two CWs transmitted in the PCell is indexed by HARQ-ACK(0) and HARQ-ACK(1) and information on the two CWs transmitted in the SCell is indexed by HARQ-ACK(2) and HARQ-ACK(3).

Reference numeral 420 shows a process of PUCCH transmission through the uplink subframe associated with two downlink subframes in the PCell/SCell (2 configured CCs).

In this case, a channel selection transmission method is performed by using A=4 resources through a mapping rule as shown in Table 4 below.

TABLE 4

Mapping of subframes on each serving cell to HARQ-ACK(j) for PUCCH format 1b HARQ-ACK channel selection for TDD with M = 2

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

Reference numerals 430 and 440 show a case of M=>2 in the PCell/SCell.

When M=3 or 4, the channel selection transmission is performed in the following way without using Tables 3 and 4 applied when M=1 or M=2.

When PDSCH transmission indicated by a PDCCH transmitted in the PCell or PDCCH indicating DL Semi-Persistent Scheduling (SPS) release is received in the PCell, PUCCH resources are induced by applying either process a-i) or a-ii) described below.

a-i) When there is SPS PDSCH transmission in the PCell, $n_{PUCCH,0}^{(1)}$ is indicated by using high layer signaling and a Transmit Power Control (TPC) field. In addition to the SPS PDSCH transmission in the PCell, when the PDCCH having Downlink Assignment Index (DAI)=1 is transmitted to indicate PDSCH transmission or DL SPS release, the PUCCH resource is derived through: $n_{PUCCH,1}^{(1)} = (M-m-1) \cdot N_c + m \cdot N_{c+1} + n_{CCE,m} + N_{PUCCH}^{(1)}$.

In this case, A/N for the SPS PDSCH is allocated to HARQ-ACK(0).

According to $j(1 \leq j \leq M-1)$, a HARQ-ACK(j) indexing rule is based on a DAI value. For example, A/N for the PDCCH having DAI=1 is allocated to HARQ-ACK(1).

In cases of the a-li) which is not the case as a-i), $n_{PUCCH}^{(1)}$ is implicitly derived from the PDCCH having DAI=1.

$n_{PUCCH}^{(1)}$ is implicitly derived from the PDCCH having DAI==2. That is, in the HARQ-ACK(j) indexing, the DAI value of the PDCCH is equal to j+1 according to $j(0 \leq j \leq M-1)$.

When PDSCH transmission indicated by the PDCCH transmitted to the SCell is received in the SCell, a method selected from either b-i) or b-i) is applied.

b-i) Cross-Carrier Scheduling on PCell $n_{PUCCH,2}^{(1)}$ is implicitly derived from the PDCCH having DAI=1.

$n_{PUCCH,3}^{(1)}$ is implicitly derived from the PDCCH having DAI=2.

b-ii) Self Scheduling $n_{PUCCH,2}^{(1)}$ and $n_{PUCCH,3}^{(1)}$ are indicated by a combination of higher layer signaling and a TPC field.

In the methods b-i) and b-ii), HARQ-ACK(j) allocation is j(0≤j≤M−1) and the DAI value is j+1.

In FIG. 4, M values of the PCell and the SCell are the same in the CA environment. However, in order to improve capabilities of the PCell and the SCell, it is required to independently configure the M values.

In the conventional (Rel-10) CA TDD, it is assumed that numbers of DL subframes associated with one PCell UL subframe are the same in a channel selection and PUCCH format 3 transmission method, because the Rel-10 CA TDD defines that all serving cells have the same TDD UL-DL configuration. However, Rel-11 supports different TDD configurations in different carriers, and additional handling is used to support the PUCCH transmission method. Accordingly, the present disclosure provides an additional handling method, which may solve errors in the PUCCH transmission method which can be generated in such an environment.

The present teachings provide a method that may solve the problems of the conventional Rel-10 channel selection transmission method generated due to different PDSCH HARQ timings between the PCell and the SCell.

In the prior art (Rel-10), the channel selection transmission method is defined as an HARQ-ACK transmission method only for the CA UE having two configured CCs. Particularly, unlike FDD (frame structure type 1), HARQ-ACK feedbacks to be transmitted on one UL subframe may become greater due to an increase in the number of DL subframes in TDD (frame structure type 2). Accordingly, in Rel-10, for the channel selection transmission in the TDD CA environment, several mapping rules and resource allocation rules are differently defined according to the number of DL subframes (that is, M values in Tables 3 and 4 above). However, as described above, when different TDD UL-DL configurations are applied to the TDD CA environment (more accurately, due to different PDSCH HARQ timings between the PCell and the SCell), additional handling is provided for channel selection transmission. Table 5 illustrates case-A, case-B, and case-C; cases that are not covered by the prior art (Rel-10), and the exemplary embodiments include an additional handling method for each of the case-A, the case-B, the case-C, and the case-D.

TABLE 5

Detailed embodiments to implement different PDSCH HARQ timings between the PCell and the SCell

|  | M = 1 for PCell | M = 2 for PCell | M = 3 for PCell | M = 4 for PCell |
|---|---|---|---|---|
| M = 1 for SCell | Rel-10 case | Case-A | Case-B | Case-C |
| M = 2 for SCell | Case-A | Rel-10 case | Case-C | Case-C |
| M = 3 for SCell | Case-B | Case-C | Rel-10 case | Case-C |
| M = 4 for SCell | Case-C | Case-C | Case-C | Rel-10 case |

M = 0 for PCell or M = 0 for SCell: Case-D

The PCell and the SCell need additional parameters for indicating different M values. The additional parameters are defined as follows.

$$K_{PCell}:\{k_{0,Pcell}, k_{1,Pcell}, \ldots, k_{M-1,Pcell}\}$$

$$K_{SCell}:\{k_{0,Scell}, k_{1,Scell}, \ldots, k_{M-1,Scell}\}$$

The additional parameters can be parameters when the PCell and the SCell have different M values.

In the case-A/B/C/D described below, #1 and #2 indicating serving cells are not limited to the PCell or the SCell, but can be defined according to each case or by an appointment between the base station and the UE. Also, when the mapping is made with HARQ-ACK(j) according to each case, orders thereof may be inversed or changed, and the order can be variously applied according to implementations.

Exemplary Case-A

First, a case where a ratio of the numbers of DL subframes on two serving cells (PCell and SCell) associated with one UL subframe is 2:1 is considered. HARQ-ACK(j) mapping according to a value of "A" which is the number of PUCCH resources required for the channel selection transmission method in the case-A is as shown in Table 6 (Mapping of Transport Block and Serving Cell to HARQ-ACK(j) for PUCCH format ab HARQ-ACK channel selection in CA with different TDD configurations).

TABLE 6

A channel selection mapping table in the case-A

| | HARQ-ACK(j) | | | |
|---|---|---|---|---|
| A | HARQ-ACK(0) | HARQ-ACK(1) | HARQ-ACK(2) | HARQ-ACK(3) |
| 3 | First subframe of serving cell #1 | Second subframe of serving cell #1 | First subframe of serving cell #2 | NA |
| 4 | First subframe of serving cell #1 | Second subframe of serving cell #1 | TB1 of serving cell#2 | TB2 of serving cell#2 |

In Table 6 HARQ-ACK index for two subframes of serving cell #1 are mapped to HARQ-ACK(0) and HARQ-ACK(1), respectively. Depending on configuring one or two TBs for the cell (serving cell #2), HARQ-ACK index on the downlink transmission in one subframe of the cell are mapped into HARQ-ACK(2) or HARQ-ACK(3), respectively.

In the case of M=2:1, a mapping relation between the number of PUCCH resources and a corresponding serving cell will be described.

Figure 5:
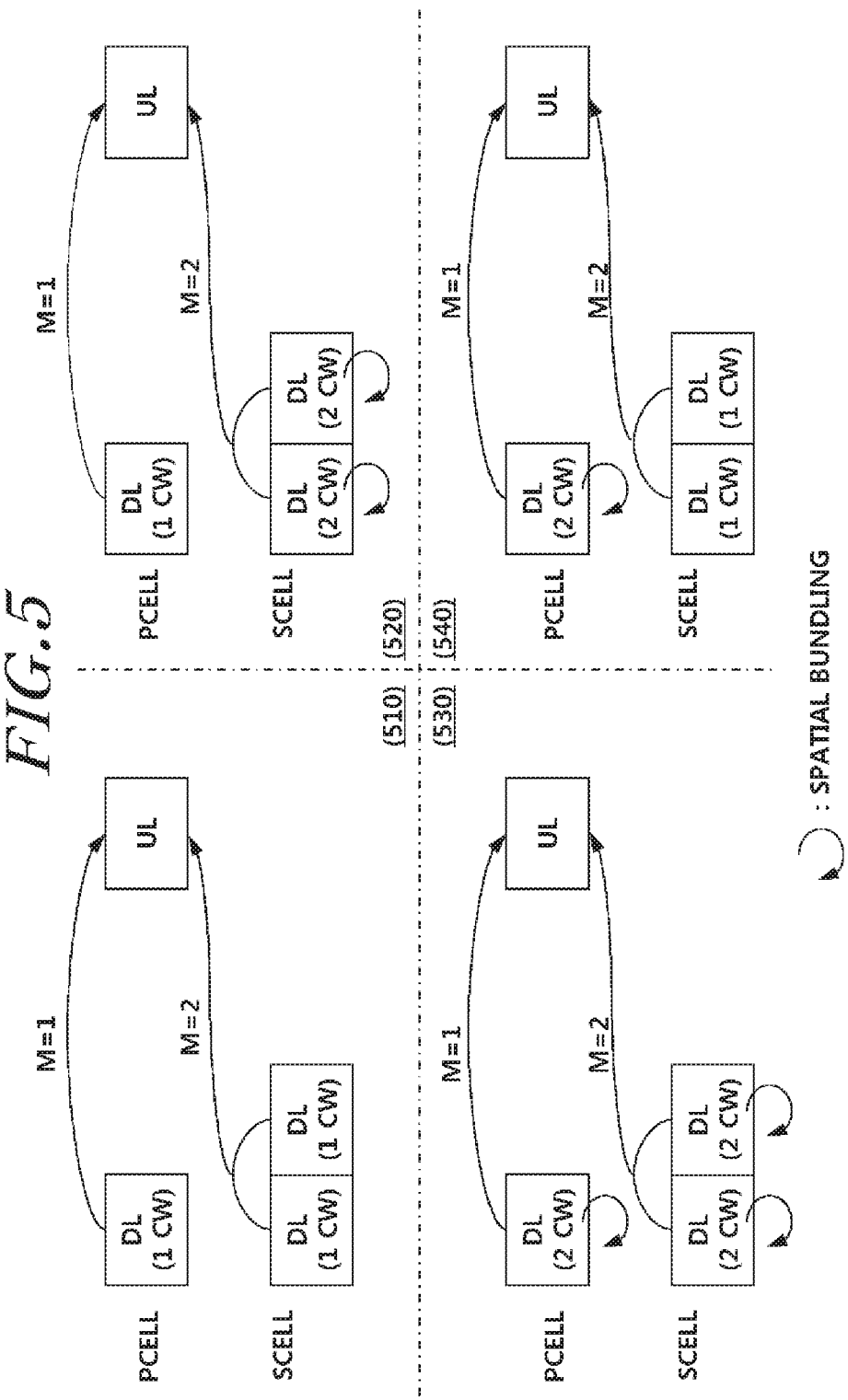
FIG. 5 is a diagram illustrating a case-A, where values of M of two cells correspond to 2:1, according to exemplary embodiments of the present invention.

FIG. 5 is a diagram illustrating the case-A, where values of M of two cells correspond to 2:1, according to exemplary embodiments of the present invention. FIG. 5 shows the case where M of the PCell is 1 and M of the SCell is 2. Although not shown, M of the PCell could be 2 and NI of the SCell could be 1, which corresponds to an inverse case of FIG. 5.

FIG. 5 shows a case where a value of "A" which is the number of the PUCCH resources for channel selection transmission is 3 (A=3).

Figure 6:
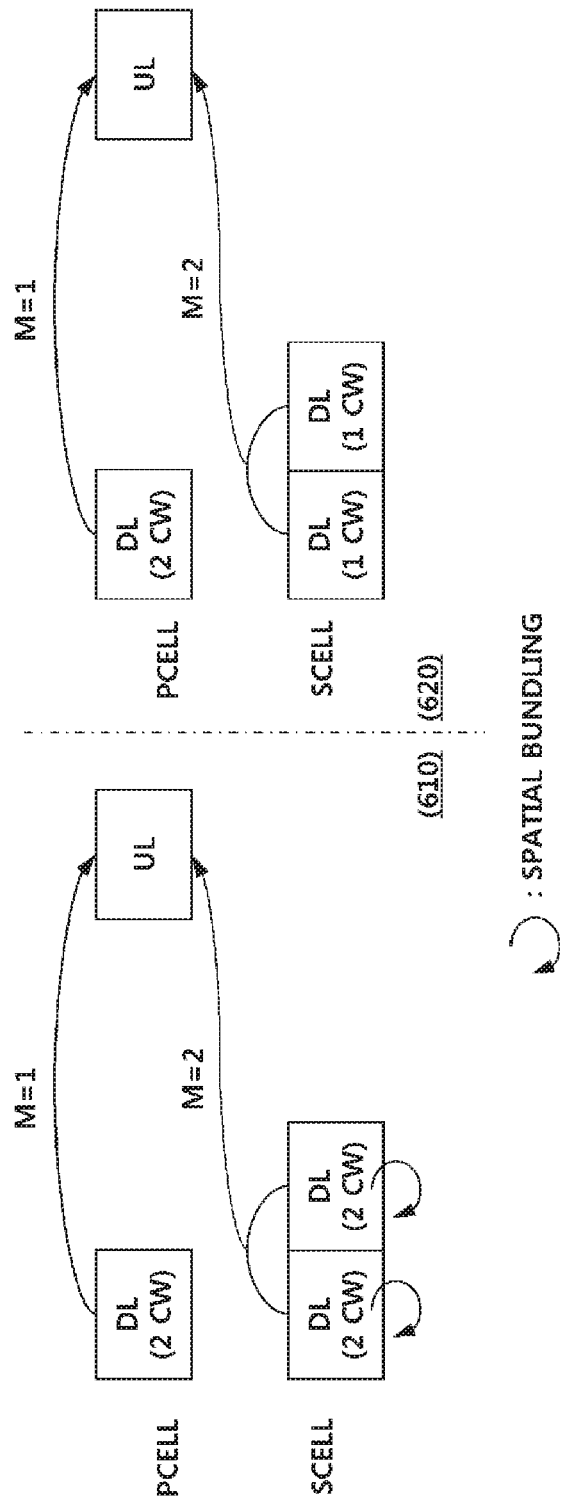
FIG. 6 is a diagram illustrating a case-A, where values of M of two cells correspond to 2:1, according to exemplary embodiments of the present invention.

In the case of A=3, different correlations are made according to a Transmission (TM) mode (i.e., 1 TB or 2 TB transmission) configured in each serving cell, the number of configured serving cells, and an NI value (see Tables 6, FIGS. 5 and 6). As illustrated in FIG. 5, in the case of A=3, when the number of HARQ-ACK bits is 4 or more, performance of spatial bundling is applied to DL subframes of all CCs as shown in reference numerals 520, 530, and 540. At this time, the transmission to PUCCH format 1b is made by using a channel selection in conjunction with mapping table of Table 6 corresponding to A=3.

That is, in the case of A=3, when Table 6 is applied to the case-A, the serving cell (M=2) in which two downlink subframes are associated with the uplink subframe is allocated to HARQ-ACK(0) and HARQ-ACK(1), and the serving cell (M=1) is allocated to HARQ-ACK(2). Of course, such an order may be inversely performed according to prearrangement. For example, in an inverse way, the serving cell (M=1) in which one downlink subframe is associated with the uplink subframe is allocated to HARQ-ACK(O), and the serving, cell (M=2) in which two downlink subframes are associated with the uplink subframe is allocated to HARQ-ACK(1) and HARQ-ACK(2)

Accordingly, reference numerals 510, 520, 530, and 540 are expressed by Table 7 according to mapping of Table 6 corresponding to A=3.

TABLE 7

HARQ-ACK(j) resource mapping in FIG. 5

| | HARQ-ACK(0) | HARQ-ACK(1) | HARQ-ACK(2) |
|---|---|---|---|
| 510 | The first subframe of SCell | The second subframe of SCell | The subframe of PCell |
| 520 | Perform spatial bundling for the first subframe of SCell | Perform spatial bundling for the second subframe of SCell | The subframe of PCell |
| 530 | Perform spatial bundling for the first subframe of SCell | Perform spatial bundling for the second subframe of SCell | Perform spatial bundling for the subframe of SCell |
| 540 | The first subframe of SCell | The second subframe of SCell | Perform spatial bundling for the subframe of PCell |

Further, c-i), c-ii), c-iii), and c-iv) are methods of inducing A(=3) PUCCH resources.

c-i) When the PDSCH indicated by reception of a PDCCH in subframe $n-k_{Pcell,m}$ ($k_{Pcell,m} \in K_{PCell}$) or "PDCCH indicating downlink SPS release" is received on the PCell, PUCCH resources can be induced through an implicit resource allocation method, such as, $n_{PUCCH,j}^{(1)} = (M-m-1) \cdot N_c + m \cdot N_{c+1} + n_{CCE,m} + n_{PUCCH}^{(1)}$.

When Table 6 (A=3) and the implicit resource allocation are used and the PCell has M=1, HARQ-ACK(2)=>$n_{PUCCH,j=2}^{(1)}$ can be induced as an example. When the PCell has M=2, two PUCCH resources can be induced from each of the DL subframes as following. Accordingly, HARQ-ACK(0)=>$n_{PUCCH,j=0}^{(1)}$, HARQ-ACK(1)=>$n_{PUCCH,j=1}^{(1)}$ can be induced by using table 6 (A==3) and the implicit resource allocation.

c-ii) In case there is a SPS transmission on the PCell, HARQ-ACK(j) for SPS transmission on the PCell uses resources for the SPS $n_{PUCCH}^{(1)}$.

c-iii) When the PDSCH by PDCCH reception in subframe $n-k_{SCell}$ ($k_{SCell} \in K_{SCell}$) on the PCell is received on the SCell, the PUCCH resource is indicated by using the implicit resource allocation method by the PDCCH received on the PCell.

c-iv) In the case where the PDSCH transmission by PDCCH reception in subframe $n-k_{SCell}$ ($k_{SCell} \in K_{SCell}$) on the SCell is received on the SCell, when the SCell has M=2, two explicit PUCCH resources are indicated by using a higher layer configuration and a TPC field within Downlink (DL) Downlink control Information (DCI) regardless of the TM mode supporting one TB or two TBs. Accordingly, HARQ-ACK(a)=>$n_{PUCCH,j=0}^{(1)}$ and HARQ-ACK(1)=>$n_{PUCCH,j=1}^{(1)}$ can be induced through the proposed table (A=3) and the method. Further, when the SCell has M=1, only one explicit PUCCH resource is indicated by using a higher layer configuration and a TPC field within the DL DCI regardless of the mode supporting one TB or two TBs.

FIG. 6 is a diagram illustrating the case-A, where values of M of two cells correspond to 2:1, according to exemplary embodiments of the present invention. FIG. 6 shows a case where M of the PCell is 1 and M of the SCell is 2. Although not shown, an inverse case of FIG. 6 may apply, where M of the PCell is 2 and M of the SCell is 1.

In FIG. 6, a value of "A" which is the number of PUCCH resources for channel selection transmission is 4 (A=4). Since the value of M in the PCell is 1, the downlink subframe corresponds to a case having only two CWs in the PCell.

FIG. 6 shows a case of A=4 where a multiplexing capability of HARQ-ACK bits is compensated to apply a method of directly multiplexing without applying spatial bundling to one serving cell (serving cell with M=1) even when the number of HARQ-ACK bits is larger than 4. Accordingly, DL throughput can increase. In this case, transmission to PUCCH format 1b can be made by using the channel selection mapping table of Table 6 corresponding to A=4.

Accordingly, reference numerals 610 and 620 may be defined as in Table 8 based on the mapping of Table 6.

TABLE 8

HARQ-ACK(j) resource mapping in FIG. 6

| | HARQ-ACK(0) | HARQ-ACK(1) | HARQ-ACK(2) | HARQ-ACK(3) |
|---|---|---|---|---|
| 610 | Perform spatial bundling for the first subframe of the SCell | Perform spatial bundling for the second subframe of the SCell | The first TB of the subframe of the PCell | The second TB of the subframe of the PCell |
| 620 | The first subframe of the SCell | The second subframe of the SCell | The first TB of the subframe of the PCell | The second TB of the subframe of the PCell |

In this case, since A=4, four PUCCH resources should be induced and an induction process corresponds to d-i), d-ii), d-lii), and d-iv).

d-i) When the PCell has M=1, all HARQ-ACK bits are directly transmitted without applying spatial bundling as shown in FIG. 6. Accordingly, resources for HARQ-ACK(2) and HARQ-ACK(3) can be induced from PUCCH resources through the implicit resource allocation method, such as, $n_{PUCCH,j=2}^{(1)} = (M-m-1) \cdot N_c + m \cdot N_{c+1} + n_{CCE,m} + n_{PUCCH}^{(1)}$ and $n_{PUCCH,j=3}^{(1)} = (M-m-1) \cdot N_c + m \cdot N_{c+1} + n_{CCE,m} + n_{PUCCH}^{(1)}$ and the following mapping relation.

d-ii) In the case where the PCell has M=1, when SPS transmission is received, HARQ-ACK(2) is indicated through the TPC field within the DL DCI and an SPS-dedicated PUCCH resource set, and HARQ-ACK(3) is indicated through $n_{PUCCH,j=3}^{(1)} = n_{PUCCH,j=2}^{(1)} + 1$ for HARQ-ACK(2).

d-iii) When the PCell has M=2, resources for HARQ-ACK(j=0) and HARQ-ACK(j=1) are indicated through the implicit method of $n_{PUCCH,j}^{(1)} = (M-m-1) \cdot N_c + m \cdot N_{c+1} + n_{CCE,m} + n_{PUCCH}^{(1)}$ on each downlink subframe.

d-iv) The SCell indicates two explicit PUCCH resources by using the higher layer configuration and the TPC field within the DL DCI regardless of M=1 or M=2.

Exemplary Case-B

Next, a case where a ratio of the numbers of DL subframes associated with one UL subframe is 3:1 on the DL subframe of two serving cells (PCell and SCell) will be first described (see Table 5). In the case-B, "A" which is the number of PUCCH resources for channel selection transmission is 4.

Hereinafter, mapping between HARQ-ACK(j) and a corresponding serving cell in the case of M=3:1 (1:3) will be described (A is the number of PUCCH resources for channel selection transmission).

Figure 7:
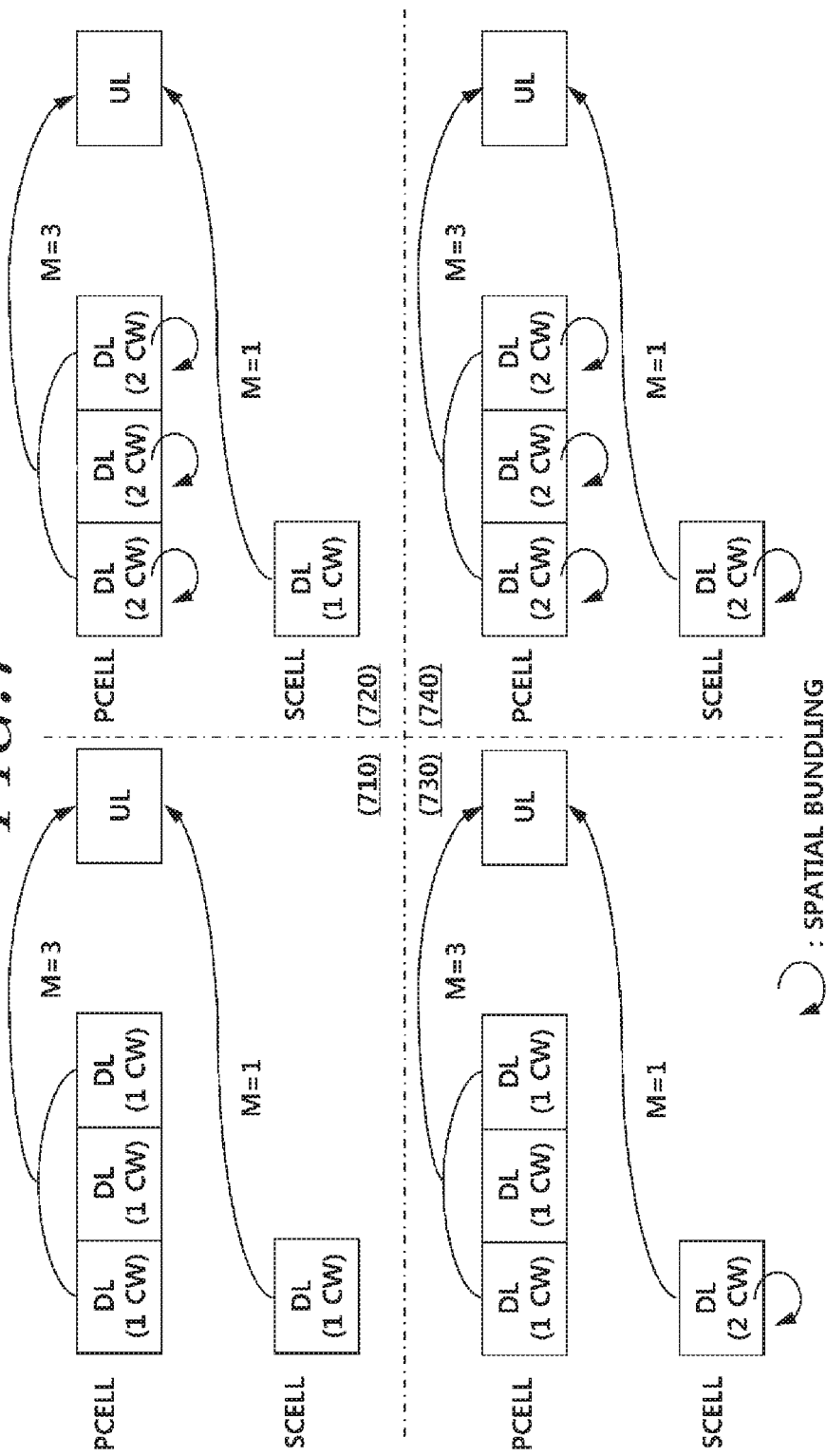
FIG. 7 illustrates not applying a time domain bundling for a serving cell having a number of downlink subframes associated with one uplink subframe (referred to as M), where M=3 according to exemplary embodiments of the present invention.
Figure 8:
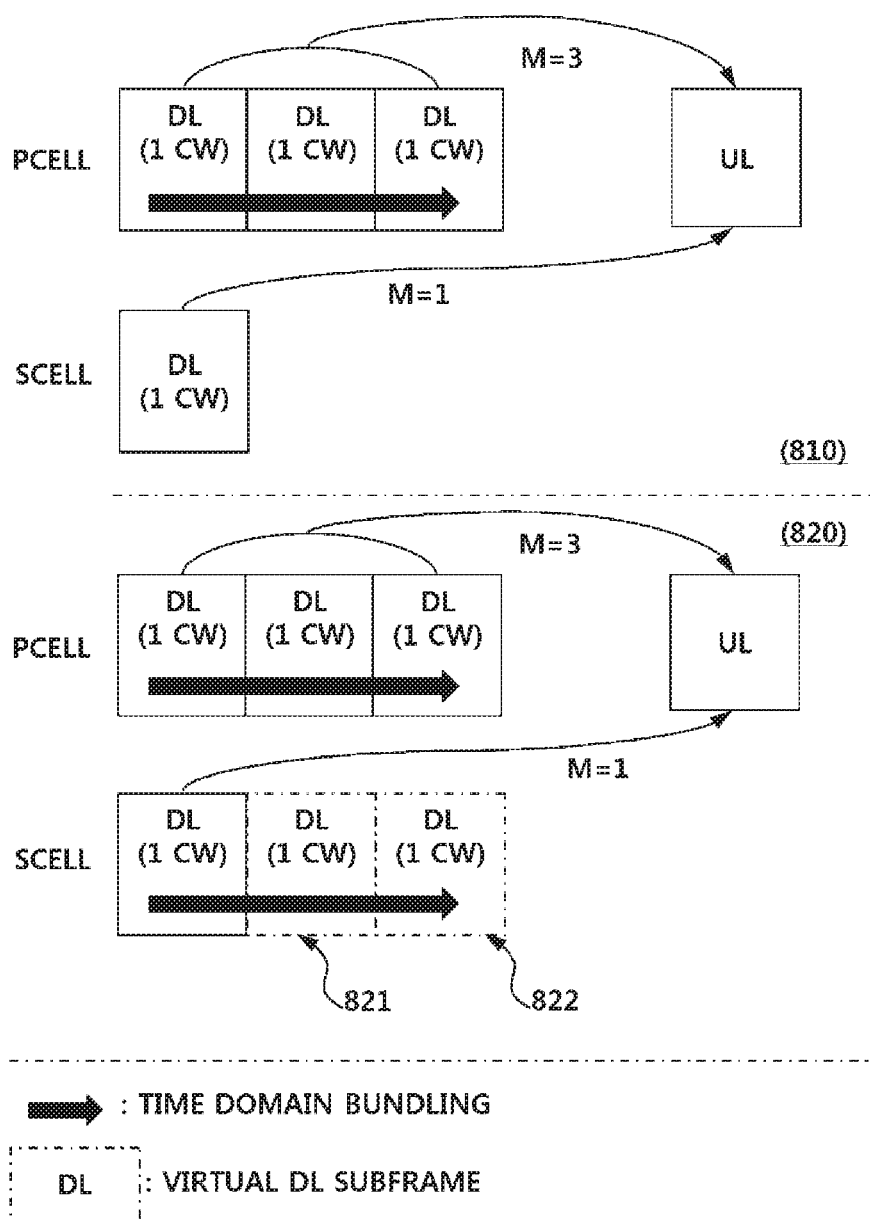
FIG. 8 illustrates applying time domain bundling according to exemplary embodiments of the present invention.
Figure 9:
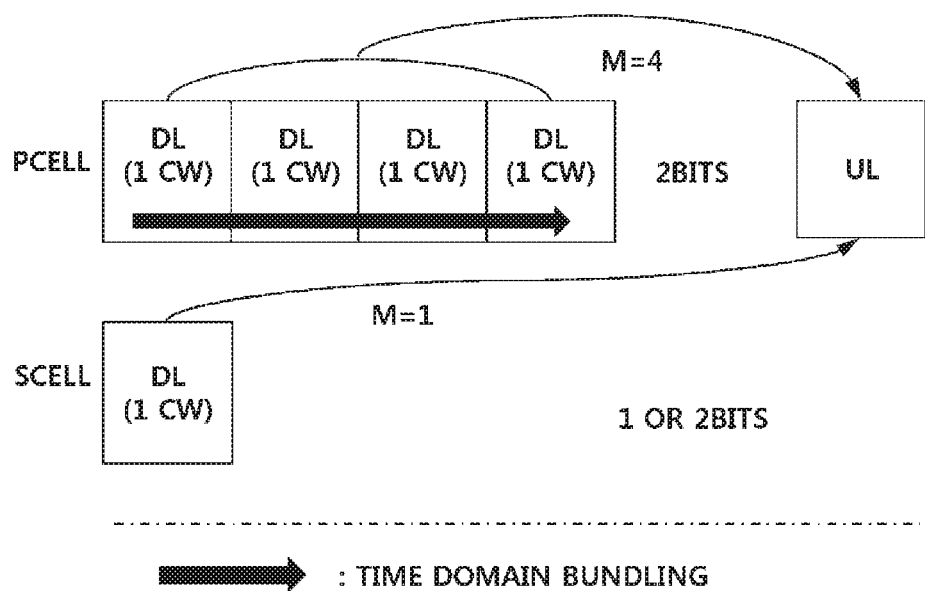
FIG. 9 illustrates where values of M of two cells correspond to 4:1 according to exemplary embodiments of the present invention.

FIG. 7, FIG. 8, and FIG. 9 show the case-B. Since one uplink subframe is associated with three downlink subframes in one serving cell in the case-B, the time domain bundling may be considered in addition to the spatial bundling (two TBs are applied to transmitted CC) like in Rel-10. Accordingly, this disclosure describes a method of transmitting HARQ-ACK in consideration of both cases where the time domain bundling is performed and not performed.

FIG. 7 illustrates not applying a time domain bundling for a serving cell having a number of downlink subframes associated with one uplink subframe (referred to as M), where M=3 according to exemplary embodiments of the present invention.

Table 9 shows an HARQ-ACK resource allocation method when M between two serving cell is 3:1 (or 1:3).

TABLE 9

Mapping in the Case-B (Mapping of each Serving Cell to HARQ-ACK(j) for PUCCH format 1b HARQ-ACK channel selection in different TDD configurations)

| | HARQ-ACK(j) | | | |
|---|---|---|---|---|
| A | HARQ-ACK(0) | HARQ-ACK(1) | HARQ-ACK(2) | HARQ-ACK(3) |
| 4 | First subframe of serving cell #1 | Second subframe of serving cell #1 | Third subframe of serving cell #1 | First subframe of serving cell #2 |

In Table 9, three downlink subframes of the serving cell (serving cell #1) in which the three downlink subframes are associated with the uplink subframe are mapped into HARQ-ACK(O), HARQ-ACK(1), and HARQ-ACK(2), respectively, and one downlink subframe of the serving cell (serving cell #2) in which the one downlink subframe is associated with the uplink subframe is mapped into HARQ-ACK(3). Of course, various modifications, such as, mapping the three downlink subframes into HARQ-ACK(1), HARQ-ACK(2), and HARQ-ACK(3), mapping other serving cells into HARQ-ACK(0), and inversely arranging the orders of Table 9 can be implemented.

Table 10 is achieved by applying Table 9 to reference numerals 710, 720, 730, and 740 of FIG. 7.

TABLE 10

| | HARQ-ACK(j) resource mapping in FIG. 7 | | | |
|---|---|---|---|---|
| | HARQ-ACK (0) | HARQ-ACK (1) | HARQ-ACK (2) | HARQ-ACK (3) |
| 710 | The first subframe of the PCell | The second subframe of the PCell | The third subframe of the PCell | The subframe of the SCell |
| 720 | Perform spatial bundling for the first subframe of the PCell | Perform spatial bundling for the second subframe of the PCell | Perform spatial bundling for the third subframe of the PCell | The subframe of the SCell |
| 730 | The first subframe of the PCell | The second subframe of the PCell | The third subframe of the PCell | Perform spatial bundling for the subframe of the SCell |
| 740 | Perform spatial bundling for the first subframe of the PCell | Perform spatial bundling for the second subframe of the PCell | Perform spatial bundling for the third subframe of the PCell | Perform spatial bundling for the subframe of the SCell |

Meanwhile, in order to indicate PUCCH resources for the HARQ-ACK(j) in Table 10, methods e-i), e-ii), and e-iii) are applied.

e-i) When the PDSCH transmission indicated by the PDCCH transmitted on the PCell or the PDCCH indicating downlink SPS release is received on the PCell, PUCCH resources can be induced on each DL subframe through the implicit resource allocation method, such as, $n_{PUCCH,j}^{(1)} = (M-m-1) \cdot N_c + m \cdot N_{c+1} + n_{CCE,m} + n_{PUCCH}^{(1)}$ and the mapping relation shown in Table 9.

e-li) When the PDSCH transmission indicated by the PDCCH transmitted on the PCell is received on the SCell, PUCCH resources can be induced on each DL subframe through the implicit resource allocation method, such as, $n_{PUCCH,j}^{(1)} = (M-m-1) \cdot N_c + m \cdot N_{c+1} + n_{CCE,m} + n_{PUCCH}^{(1)}$ and the mapping relation in Table 8.

e-iii) In the case of M=1, the SCell indicates one explicit PUCCH resource by using the higher layer configuration and the TPC field within the DL DCI In the case of M=3, the SCell indicates three explicit PUCCH resources by using the higher layer configuration and the TPC field within the DL DCI.

FIG. 8 illustrates applying the time domain bundling according to exemplary embodiments of the present invention. Reference numeral 810 corresponds to the case of applying the time domain bundling only to the serving cell having M=3, and reference numeral 820 corresponds to the case where the time domain bundling is applied to the serving cell having M=1 as well as the serving cell having M=3.

In reference numeral 810, the PCell performs the time domain bundling for three downlink subframes and thus requires two HARQ-ACK resources. Since the SCell is one CW, the SCell requires one HARQ-ACK resource. The case where the SCell is two CWs in this process corresponds to the case-C, and the SCell requires a total of four HARQ-ACK resources.

Since A is 2, the case of reference numeral 810 can be implemented in a similar way to that of Table 6. The implementation is made as shown in Table 11. When Table 11 is applied to reference numeral 810, serving cell #1 is the PCell and serving cell #2 is the SCell. The case where one CW is transmitted in the SCell corresponds to A=3 of Table 11, and the case where two CWs are transmitted in the SCell corresponds to A=4 of Table 11.

TABLE 11

A channel selection mapping table in the Cases-B and C
(time domain bundling is applied only to the case of M = 3)

| A | HARQ-ACK(j) | | | |
|---|---|---|---|---|
| | HARQ-ACK(0) | HARQ-ACK(1) | HARQ-ACK(2) | HARQ-ACK(3) |
| 3 | Result of Time Domain Bundling in Serving cell #1 | First subframe of serving cell #2 | NA | |
| 4 | Result of Time Domain Bundling in Serving cell #1 | TB1 of serving cell#2 | TB2 of serving cell#2 | |

A more detailed description will be made below.

In reference numeral 810, the channel selection mapping table corresponding to A=3 of Table 3 may be used. In some embodiments, when the TB of the serving cell, which does not apply the time domain bundling, is in a 2-TB transmission mode, the channel selection transmission can be performed by using the channel selection mapping table corresponding to A=4 of Table 3.

Two PUCCH resources are induced through the serving cell having M=3 and one or two resources are induced through another serving cell (M=1). $n_{PUCCH,j=0}^{(1)}$ and $n_{PUCCH,j=1}^{(1)}$ are derived from the PCell, $n_{PUCCH,j=2}^{(1)}$ and $n_{PUCCH,j=3}^{(1)}$ are derived from the SCell, as described above. In this case, the serving cell and HARQ-ACK mapping relation as shown in Table 9 is not used.

Reference numeral 820 shows the case of applying the time domain bundling to the serving cell having M=1 as well as the serving cell having M=3. In order to apply the time domain bundling to the serving cell having M=1, it is assumed that there is a virtual DL subframe. An A/N value for the virtual DL subframe corresponds to one state among those including Discontinuous Transmission (DTX), Acknowledge or Acknowledgement (ACK), or Negative Acknowledgement (NACK) according to prearrangement with the base station.

In reference numeral 820, since the PCell has the M=3 number of DL subframes and the SCell has the M=1 number of DL subframe, a time domain bundling method is applied based on a larger M value for both two serving cells, that is, M=3. Accordingly, by virtually assuming that the serving cell (SCell in reference numeral 820) having M=1 has an M=3, there seems to be an environment where both the conventional PCell and SCell have the same M=3. Therefore, HARQ-ACK is transmitted by using the same M=3 time domain bundling.

An associated PUCCH resource allocation method can be implemented through the aforementioned method.

In this case, the serving cell and HARQ-ACK mapping relation as shown in Table 9 is not used.

In reference numeral 820, it is assumed that the serving cell having a smaller M value has the M value of the serving cell having a larger M value (in this case M>2). In reference numeral 820, it is assumed that an M value of the SCell is 3.

Under this assumption, the UE may appoint or configure in advance ACK/NACK information (A/N state) of a blank subframe (or virtual subframe), such as, reference numeral 821 or 822 as DTX or NACK/DTX.

Exemplary Case-C

In the cases which are not the case-A/B, the time domain bundling can be applied as shown in FIG. 9. FIG. 9 illustrates where values of M of two cells correspond to 4:1 according to exemplary embodiments of the present invention.

FIG. 9 shows a case where a ratio of M values of two cells is one of 4:1/4:2/4:3/3:2 according to exemplary embodiments of the present invention. In FIG. 9, the PCell performs the time domain bundling to map into two bits, that is, two HARQ-ACK resources. Meanwhile, in case the number of CW in the SCell is one or two, or when one or two subframes are transmitted, the SCell can be mapped into 1 or 2 bits. As a result, two HARQ-ACK resources are needed anyway. Additionally, when M=3 in the SCell, the time domain bundling can be performed in the SCell.

That is, the time domain bundling is applied to the cell having the larger M value between two cells. When the M value of the other cell is 3, the time domain bundling can be also applied. In some embodiments, as described above, based on the method using larger M value, the current Rel-10 PUCCH A/N transmission method can be applied to two serving cells by using the virtual DL subframe in order to make the same M values between PCell and SCell.

Exemplary Case-D

In the case-A to case-C, the M values of the PCell and the SCell are not 0 and are different from each other.

Meanwhile, when a currently considered combination of HARQ timings which can be applied for the PCell and the SCell is considered, a case where there is no downlink subframe related to a particular uplink subframe on one serving cell of the PCell and the SCell, that is, a case where there is no A/N transmission due to no PDSCH can occur. In other words, only the A/N for the PDCCH indicating the PDSCH transmission and the DL SPS release on the PCell in the particular uplink subframe is transmitted without those of SCell or only the A/N for the PDCCH indicating the PDSCH transmission or the DL SPS release on the SCell is to transmitted without those of PCell.

For example, with respect to the PCell and the SCell, M=1:0, 0:1, 2:0, 0:2, or 0:4. However, this case is not limited thereto.

In this case, in one example, by virtually assuming that the M value of the cell in which there is no downlink subframe (i.e. M=0) is the same M value of the other cell in which there is the downlink subframe in a similar way to that of reference numeral 820 of FIG. 8, so that an environment where the two cells have the same M value can be applied. For example, in the case of M=0 of the PCell and M=1 of the SCell, it is assumed that M=1 with respect to the PCell. Consequently, the PCell and the SCell apply the PUCCH resource allocation method corresponding to M=1.

However, the UE and the base station can fix A/N information as DTX in the case of M=0, and the UE is not required to report corresponding DTX information to the base station. In this case, a channel selection transmission method described below can be used.

The following technology assumes an environment where two serving cells are configured. When cross-carrier scheduling with carrier indicator field (CIF) is configured on PCell, it is assumed that the PCell is a scheduling cell which performs scheduling for the cells, and the SCell is a scheduled cell which is scheduled by the scheduling cell (i.e. PCell).

Exemplary Case D-1: M=1:0

Figure 10:
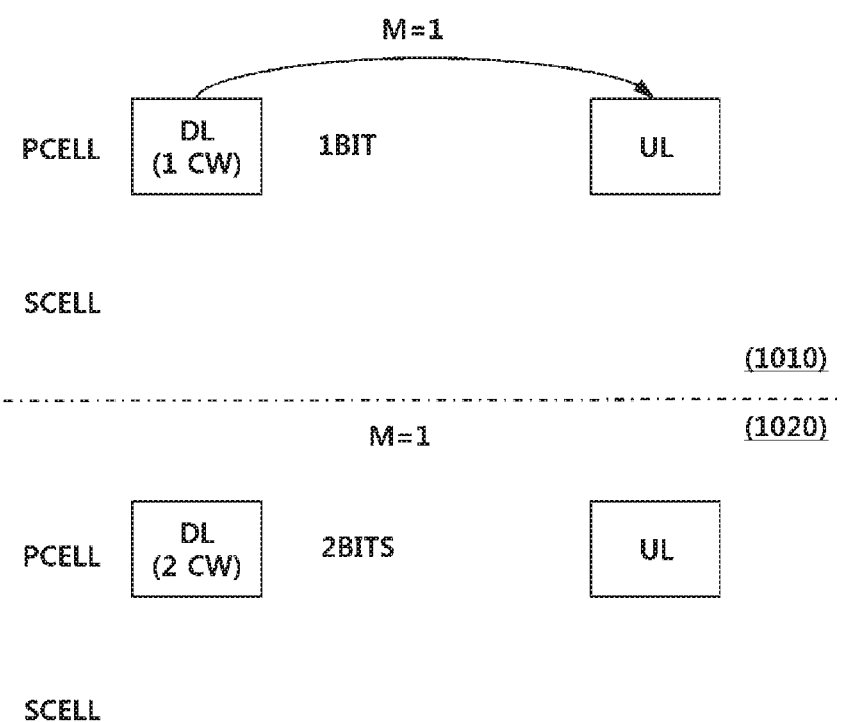
FIG. 10 illustrates where values of M of two cells correspond to 1:0 according to exemplary embodiments of the present invention.

FIG. 10 illustrates M=1 of the PCell and M=0 of the SCell according to exemplary embodiments of the present invention. In this case, PUCCH format 1a/1b can be used for HARQ-ACK transmission with respect to PDSCH transmission on one downlink subframe on the PCell. That is, when one CW is transmitted in the PCell like in reference numeral 1010, PUCCH format 1a can be used for 1 bit HARQ-ACK transmission. When two CWs are transmitted as shown in reference numeral 1020, PUCCH format ab can be used for 2 bit HARQ-ACK transmission. In this case, since the PDSCH transmission is shown on the PCell, PUCCH resources can be derived from a first CCE (nCCE) to which the PDCCH (DAI=1) indicating the corresponding PDSCH transmission is allocated. Also for the DL SPS release, same approach is applied for PUCCH resource derivation.

Exemplary Case D-2: M=2:0

Figure 11:
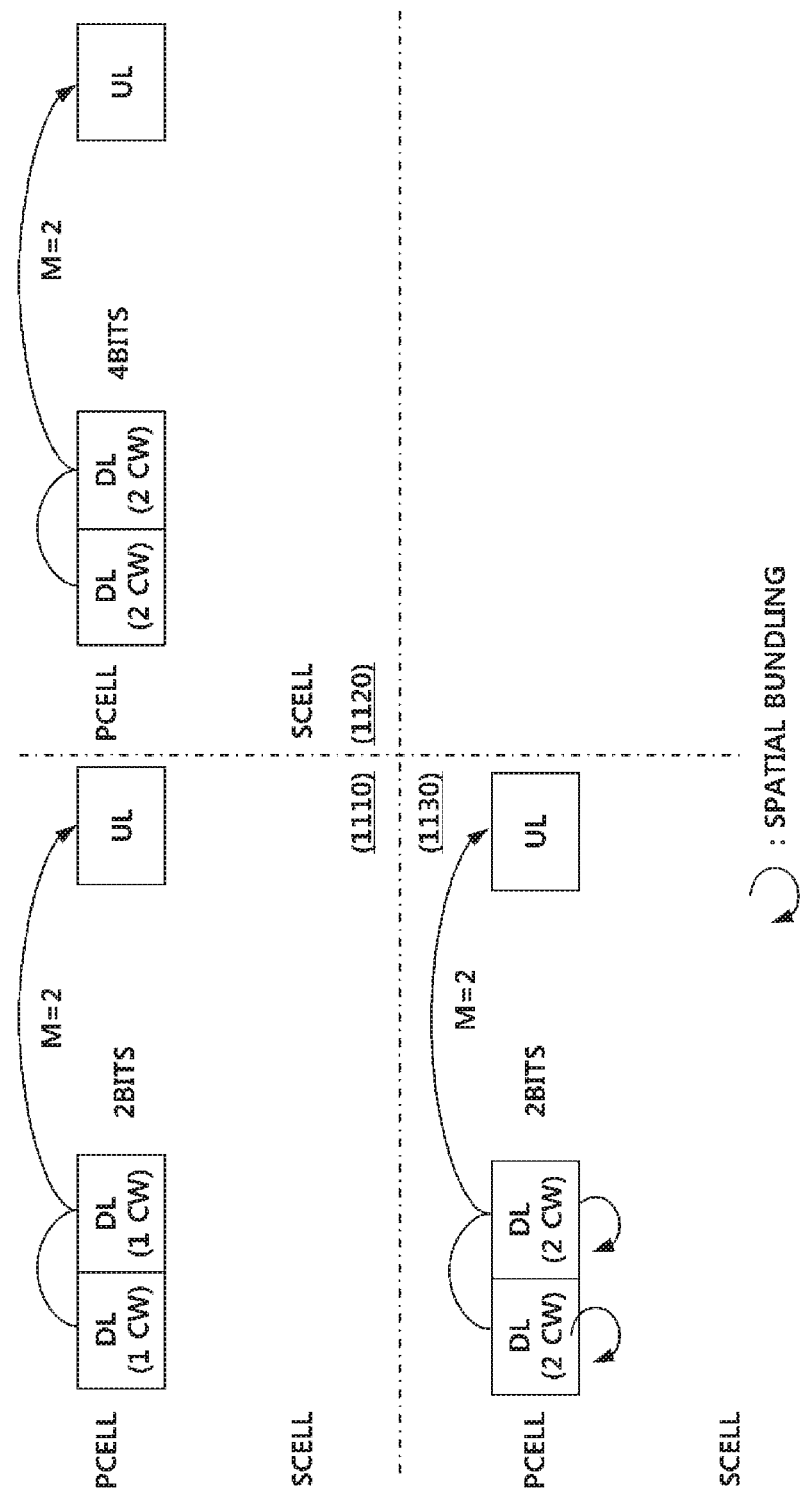
FIG. 11 illustrates where values of M of two cells correspond to 2:0 according to exemplary embodiments of the present invention.

FIG. 11 illustrates M=2 of the PCell and M=0 of the SCell according to exemplary embodiments of the present invention. In the PCell, the PDSCH transmission to two downlink subframes can be generated.

In one example, channel selection transmission can be performed by using a relation table between an HARQ-ACK index and a transport block transmitted on the serving cell of Table 12 and a channel selection mapping table. The TB and the serving cell can be associated with the HARQ-ACK(j) index by using Table 12.

TABLE 12

A relation mapping table between HARQ-ACK index and a transport block of the serving cell in M = 2:0

| A | HARQ-ACK(0) | HARQ-ACK(1) | HARQ-ACK(2) | HARQ-ACK(3) |
|---|---|---|---|---|
| 2 | First subframe of serving cell #1 | Second subframe of serving cell #1 | NA | NA |
| 4 | TB1 of first subframe in serving cell#1 | TB2 of first subframe in serving cell#1 | TB1 of second subframe in serving cell#1 | TB2 of second subframe in serving cell#1 |

As noted from reference numeral 1110 of FIG. 11, when one CW is transmitted in the PCell (not MIMO transmission mode), the number of required PUCCH resources (A) is 2 and corresponds to A=2 of Table 12. A total of two PUCCH resources can be induced through nCCE of the PDCCH (DAI=1, 2) in each downlink subframe.

As noted from reference numeral 1120 of FIG. 11, when two CWs are transmitted in the PCell (MIMO transmission mode), the number of required PUCCH resources (A) is 4 and corresponds to A=4 of Table 12. A total of four PUCCH resources can be induced through nCCE and nCCE+1 of the PDCCH (DAI=1, 2) in each downlink subframe.

In some embodiments, as noted from reference numeral 1130 of FIG. 11, when two CWs are transmitted in the PCell (MIMO transmission mode), the spatial bundling is applied to each downlink subframe of the PCell and two HARQ-ACK bits are transmitted PUCCH format 1b. The PUCCH resource can be induced through nCCE of the PDCCH in each downlink subframe.

Exemplary Case D-2: M=0:1

Figure 12:
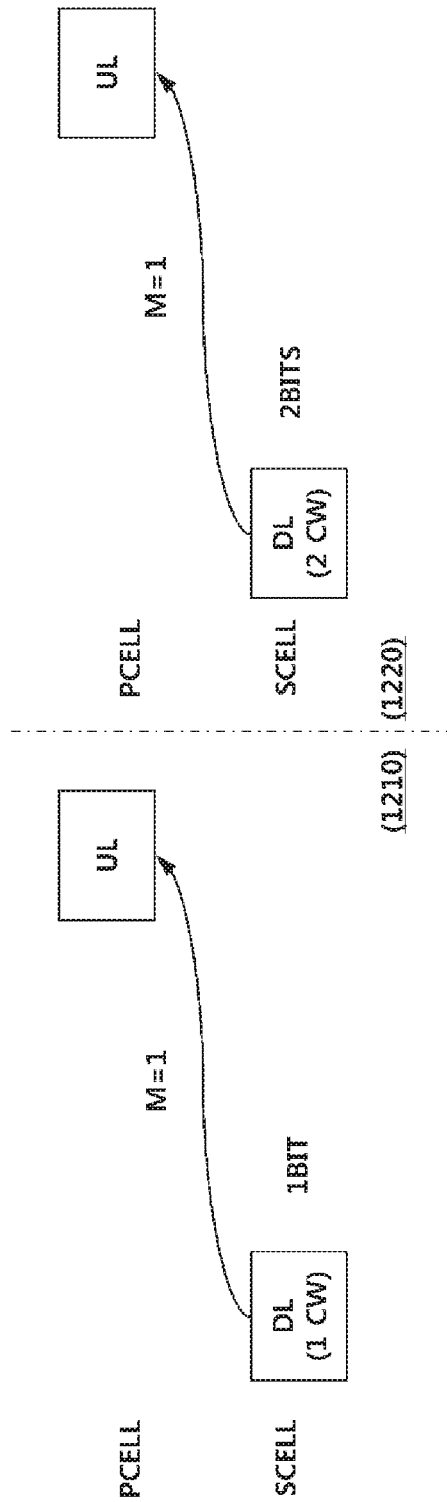
FIG. 12 illustrates where values of M of two cells correspond to 0:1 according to exemplary embodiments of the present invention.

FIG. 12 illustrates M=1 of the PCell and M=0 of the SCell according to exemplary embodiments of the present invention. In this case, PUCCH format 1a/1b can be used for HARQ-ACK transmission with respect to the PDSCH. That is, when one CW is transmitted in the SCell as noted from reference numeral 1210, PUCCH format 1a can be used for 1 bit HARQ-ACK transmission. When two CWs are used as noted from reference numeral 1220, PUCCH format 1b can be used for 2 bit HARQ-ACK transmission.

In a case of self-scheduling (PDSCH scheduling information of the SCell is transmitted through the PDCCH of the SCell), the PUCCH resource can be derived from the Acknowledgement Resource Indication (ARI) reusing the TPC field (2 bits) within the PDCCH (that is, DL DCI format) of the SCell.

In a case of cross carrier scheduling, the PUCCH resource can be derived from a first CCE (nCCE) to which the PDCCH of the PCell is allocated. Meanwhile, when the PCell cannot control the PDSCH transmission to the downlink subframe on the corresponding SCell, that is, when the subframe configured as the downlink by the SCell is not configured as the downlink by the PCell, HARQ-ACK may not be transmitted.

Exemplary Case D-4: M=0:2

Figure 13:
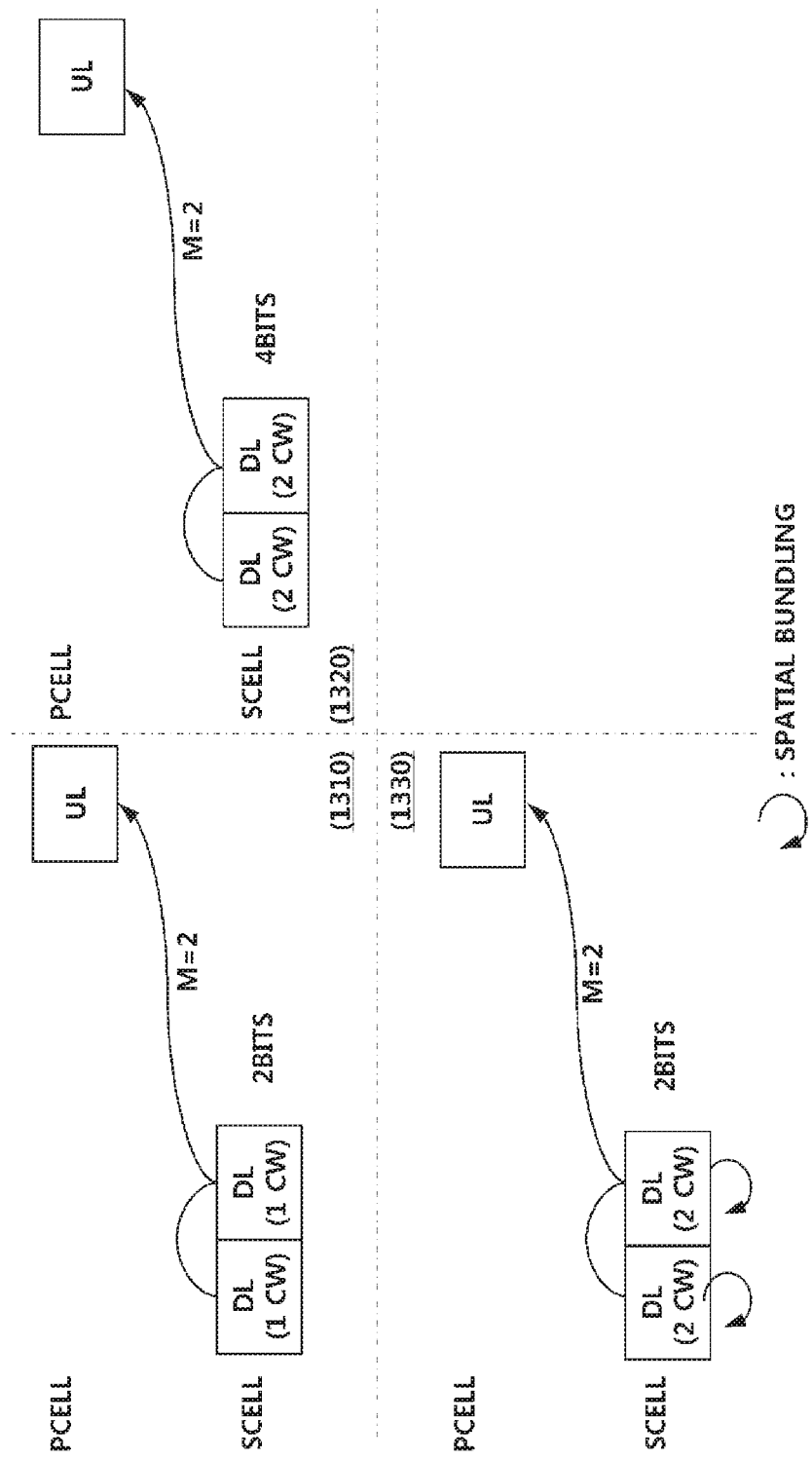
FIG. 13 illustrates where values of M of two cells correspond to 0:2 according to exemplary embodiments of the present invention.

FIG. 13 illustrates M=0 of the PCell and M=2 of the SCell according to exemplary embodiments of the present invention. The PDSCH transmission in two downlink subframes may be generated in the SCell.

In one example, channel selection transmission can be performed by using the relation between the HARQ-ACK index and the transport block of the serving cell and the channel selection mapping table. The TB and the serving cell can be associated with the HARQ-ACK(j) index by using Table 12.

As noted from reference numeral 1310 of FIG. 13, when one CW is transmitted in the SCell (not MIMO transmission mode), the number of required PUCCH resources is 2 and corresponds to A=2 of Table 12.

As noted from reference numeral 1320 of FIG. 13, when two CWs are transmitted in the SCell (MIMO transmission mode), the number of required PUCCH resources (A) is 4 and corresponds to A=4 of Table 12.

In some embodiments, as noted from reference numeral 1330 of FIG. 13, when two CWs are transmitted in the SCell (MIMO transmission mode), spatial bundling is applied to each downlink subframe of the SCell and two HARQ-ACK bits can be transmitted by PUCCH format 1b.

In the case of the self-scheduling, the PUCCH resource can be induced as follows.

1) When two CWs are transmitted in the SCell (A=4, the SCell receives four resources through the ARI reusing the TPC field (two bits) within the PDCCH and induces a relation between the corresponding PUCCH resource and the HARQ-ACK index by using a mapping relation between the case of A=4 of Table 12 and the HARQ-ACK index. At this time, the ARI can indicate four PUCCH resources.

2) When one CW is transmitted in the SCell, or when two CWs are transmitted in the SCell and spatial bundling is applied to each downlink subframe, the SCell receives two resources through the ARI reusing the TPC field (two bits) within the PDCCH and induces a relation between the corresponding PUCCH resource and the HARQ-ACK index by using a mapping relation between the case of A=2 of Table 12 and the HARQ-ACK index. At this time, the ARI can indicate two PUCCH resources.

In a case of cross carrier scheduling, the PUCCH resource can be induced as follows.

1) When two CWs are transmitted in the SCell (A=4), a total of four PUCCH resources can be induced through nCCE and nCCE+1 of the PDCCH (DAI=1, 2) of the PCell in each downlink subframe.

2) When one CW is transmitted in the SCell, or when two CWs are transmitted in the SCell and spatial bundling is applied to each downlink subframe, a total of two PUCCH resources can be induced through nCCE of the PDCCH (DAI=1, 2) of the PCell in each downlink subframe.

Meanwhile, when the PCell cannot control the PDSCH transmission to the downlink subframe on the corresponding SCell, that is, when the subframe configured as the downlink by the SCell is not configured as the downlink by the PCell, HARQ-ACK may not be transmitted.

Exemplary Case D-4: M=0:4

Figure 14:
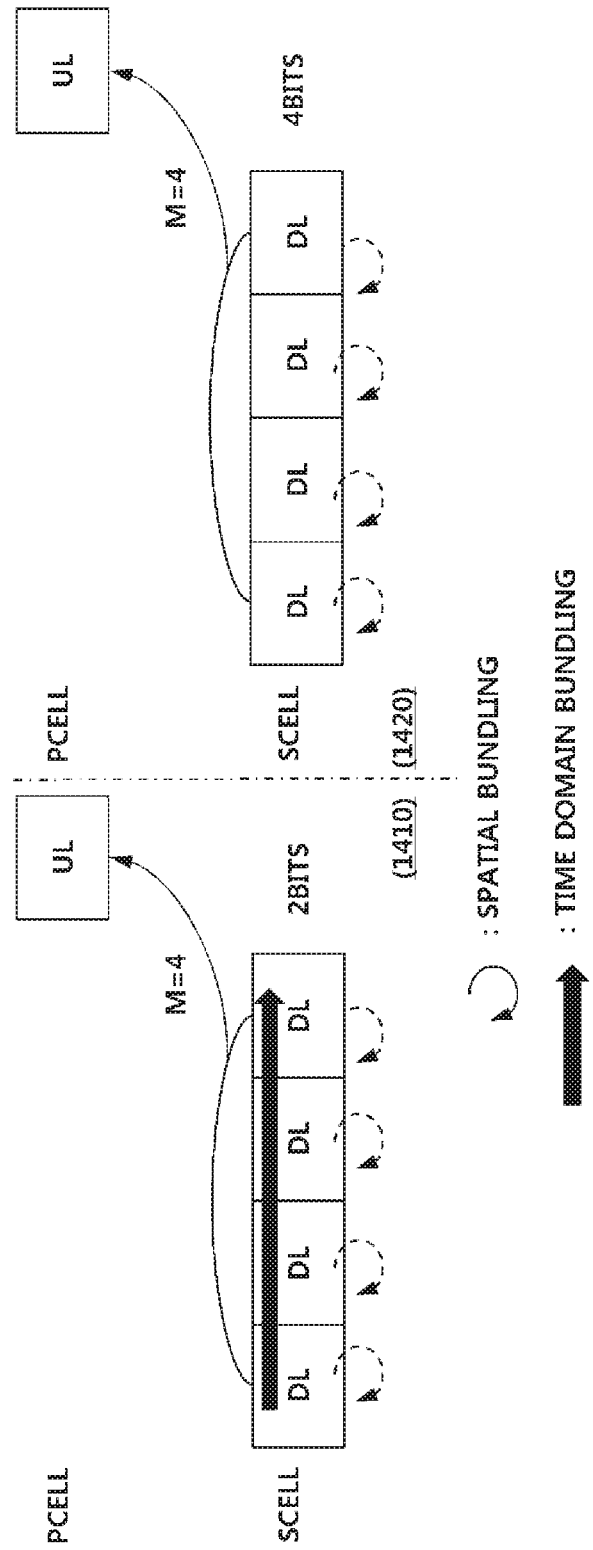
FIG. 14 illustrates where values of M of two cells correspond to 0:4 according to exemplary embodiments of the present invention.

FIG. 14 illustrates M=0 of the PCell and M=4 of the SCell according to exemplary embodiments of the present invention. PDSCH transmission to four downlink subframes can be generated in the SCell.

In the case of the self-scheduling, the PUCCH resource can be induced as follows.

1) As noted from reference numeral 1410 of FIG. 14, the spatial bundling is applied when two CWs are first transmitted in the SCell (MIMO transmission mode), and the spatial bundling is not applied when one CW is transmitted. As shown in Table 13 below, time domain bundling is applied to generate two HARQ-ACK bits and the generated two HARQ-ACK bits can be transmitted by using the channel selection mapping table having A=2. In the case of the self-scheduling on the downlink subframe corresponding to DAI=1 or 2, indication can be made by using the ARI (the same ARI value can be transmitted through the PDCCH transmitting the DAI=1 or 2).

TABLE 13

| Time domain bundling table with M = 4 | |
|---|---|
| HARQ-ACK(0), HARQ-ACK(1), HARQ-ACK(2), HARQ-ACK(3) | Mapped state |
| 'D, any, any, any' or no DL assignment is received. | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

2) As described in 1), bundled two HARQ-ACK bits can be transmitted to PUCCH format 1b.

3) As noted from reference numeral 1420 of FIG. 14, the spatial bundling is applied when two CWs are transmitted in the SCell (MIMO transmission mode) and the spatial bundling is not applied when one CW is transmitted. Since time domain bundling is not applied, four HARQ-ACK bits are generated by using the spatial bundling if configured by MIMO transmission mode (i.e. 2 CW), and channel selection transmission method can be performed by using the mapping relation between the TB and the HARQ-ACK index corresponding to A=4 in Table 14 and the channel selection mapping table corresponding to A=4. In the case of the self-scheduling on the downlink subframe corresponding to DAI=1, 2, 3, and 4, indication can be made by using the ARI (the same ARI value can be transmitted through the PDCCH transmitting DAI=1, 2, 3, and 4).

TABLE 14

A relation mapping table between the HARQ-ACK index and the TB of the serving cell in the case of M = 0:4

| | HARQ-ACK(j) | | | |
|---|---|---|---|---|
| A | HARQ-ACK(0) | HARQ-ACK(1) | HARQ-ACK(2) | HARQ-ACK(3) |
| 4 | first subframe in serving cell#1 | second subframe in serving cell#1 | third subframe in serving cell#1 | fourth subframe in serving cell#1 |

In the case of the cross carrier scheduling, the PUCCH resource can be induced as follows.

1) As noted from reference numeral 1410 of FIG. 14, when two CWs are first transmitted in the SCell (MIMO transmission mode, the spatial bundling is applied and the time domain bundling is applied as shown in Table 13. Accordingly, two HARQ-ACK bits are generated and channel selection transmission can be performed by using the channel selection mapping table corresponding to A=2. In the case of the cross carrier scheduling on the downlink subframe corresponding to DAI=1 and 2, indication can be made by using the PUCCH resource derived from the nCCE index to which the PDCCH is allocated. In a condition where the PCell cannot schedule the PDSCH transmission to the downlink subframe on the corresponding SCell, HARQ-ACK may not be transmitted.

2) As described in 1), bundled two HARQ-ACK bits can be transmitted to PUCCH format 1b.

3) As noted from reference numeral 1420 of FIG. 14, when two CWs are transmitted in the SCell (MIMO transmission mode), the spatial bundling is applied and the time domain bundling is not applied. Accordingly, four HARQ-ACK bits are generated, and channel selection transmission can be performed by using a mapping relation between the TB corresponding to A=4 of Table 14 and the HARQ-ACK index and the channel selection mapping table corresponding to A=4. In the case of the cross carrier scheduling on the downlink subframe corresponding to DAI=1, 2, 3, and 4, indication can be made by using the PUCCH resource derived from the nCCE index to which the PDCCH is allocated. In a condition where the PCell cannot schedule the PDSCH transmission to the downlink subframe on the SCell, HARQ-ACK may not be transmitted.

The above-described example discloses, in detail, a case where M=0 of the PCell and M=4 of the SCell, but the M value of the SCell may be a value larger than 2. For example, when M=3, two HARQ-ACK bits can be generated by using the time domain bundling using Table 15 or three HARQ-ACK bits can be generated without time domain bundling.

TABLE 15

| Time domain bundling table with M = 3 | |
|---|---|
| HARQ-ACK(0), HARQ-ACK(1), HARQ-ACK(2) | Mapped state |
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

Further, the above-described example discloses M=0 of the PCell, but a case of M=0 in the SCell can be applied.

So far, the detailed embodiments have been described to control the case where TDD configurations of two cells are different in an implementation of the channel selection transmission in the two cells.

Figure 15:
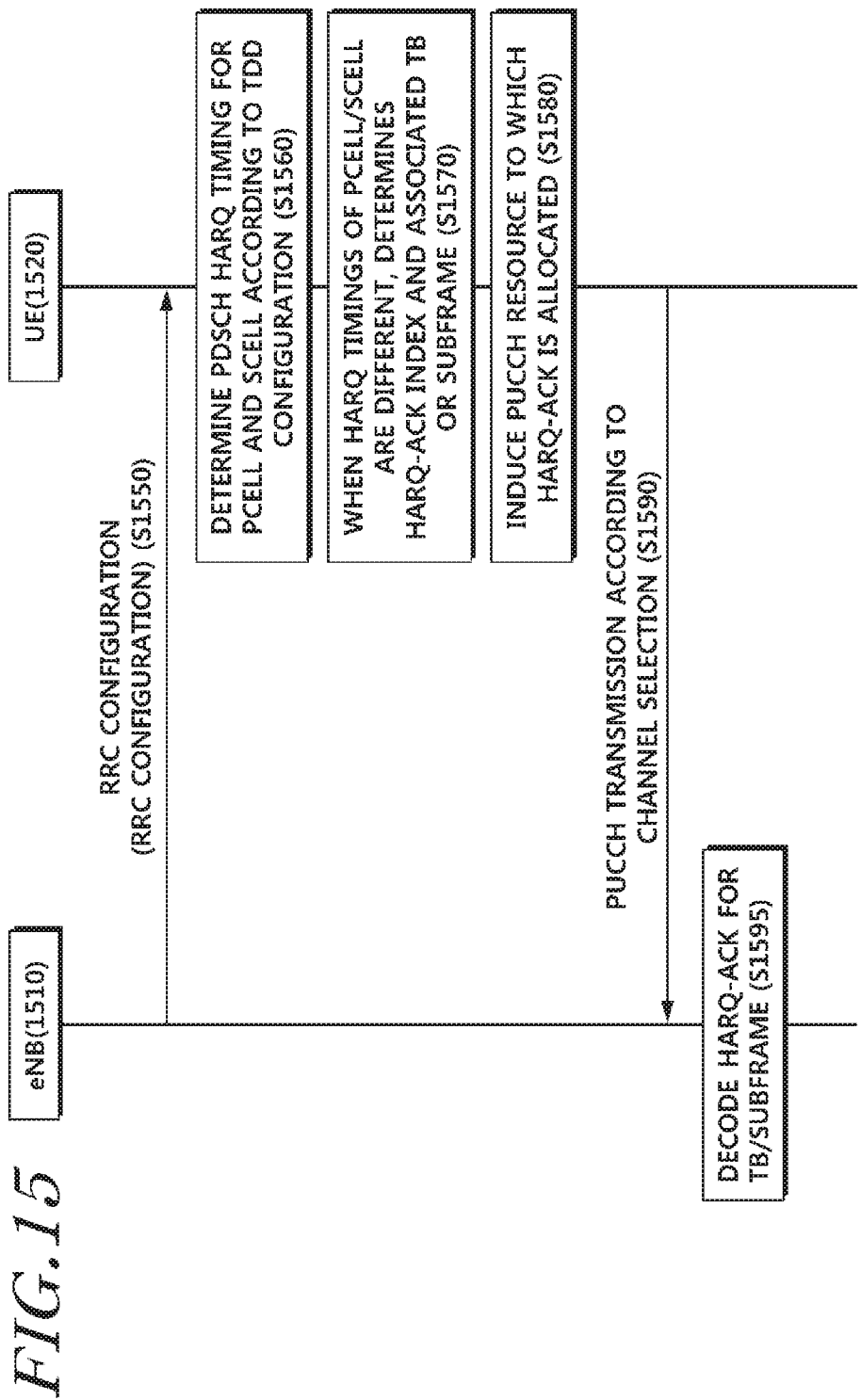
FIG. 15 is a diagram illustrating signaling between a base station and a UE according to exemplary embodiments of the present invention.

FIG. 15 is a diagram illustrating signaling between a base station, shown as an eNB, and a UE according to exemplary embodiments of the present invention. An eNB 1510 performs a RRC configuration of a UE 1520 in step S1550. In this process, two CCs are configured, channel selection is performed, and different TDD configurations are configured for each CC. As configured in step S1550, the UE 1520 determines PDSCH HARQ timings for the PCell and the SCell according to the TDD configurations in step S1560. Further, when HARQ timings of the PCell and the SCell are different, that is, when the HARQ timings of the two cells are different like in the case-A, the case-B, the case-C, and the case-D as shown in Table 5, the TB or the subframe associated with the HARQ-ACK index is determined by applying the method described through FIG. 5, FIG. 6, FIG. 7, FIG. 8, FIG. 9, FIG. 10, FIG. 11, FIG. 12, FIG. 13 and FIG. 14, and Tables 6 to 15 in step S1570. That is, it is determined which TB or which subframe mapped into which HARQ-ACK index. Further, the PUCCH resource to which HARQ-ACK is to be allocated is induced in step S1580. As described above, the induction of the PUCCH resource may be performed by using the implicit resource allocation method in which the resource is derived from the downlink subframe of the PCell or the explicit resource allocation method using explicitly provided information, such as, the higher layer signaling (higher layer configuration) or the TPC field within the DL DCI. The H-HARQ-ACK mapping and the PUCCH resource induction method are all predetermined by the eNB 1510 and the UE 1520.

When the PUCCH resource is induced, a corresponding HARQ-ACK is inserted into the induced PUCCH resource and PUCCH transmission according to channel selection is performed in step S1590. The eNB 1510 decodes HARQ-ACK for the TB/subframe in step S1595.

Figure 16:
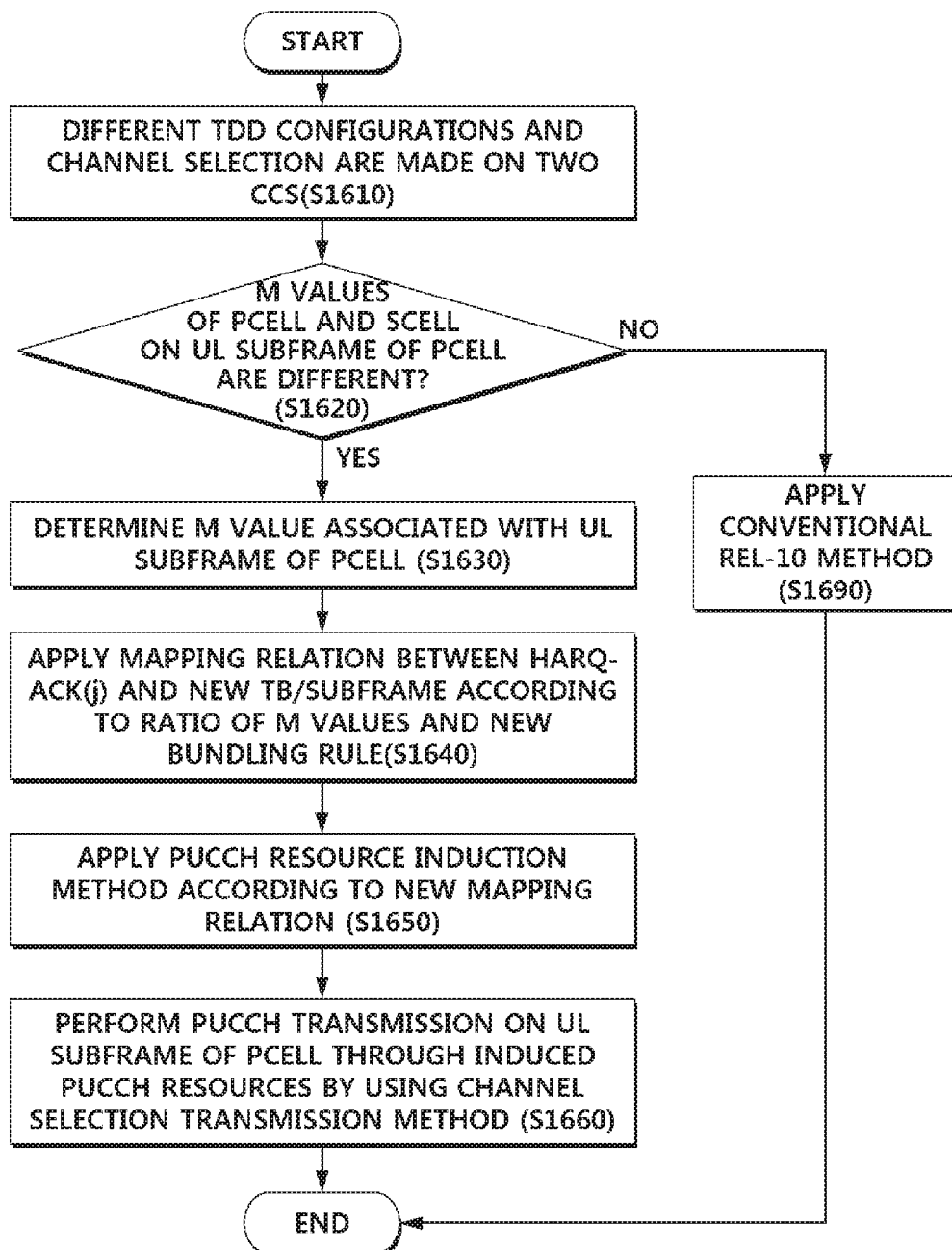
FIG. 16 is a diagram illustrating a process performed in a UE according to exemplary embodiments of the present invention.

FIG. 16 is a diagram illustrating a process performed in the UE according to exemplary embodiments of the present invention. FIG. 16 describes the UE operation described through FIG. 15 in more detail.

The UE performs an RRC configuration step from the eNB, and different TDD configurations and channel selection are made on two CCs in step S1610. Further, it is identified whether M values for the PCell and the SCell are different on the UL subframe of the PCell in step S1620. As shown in Table 5, the different M values correspond to the case-A, the case-B, the case-C, and the case-D. When the M values are the same, the conventional Rel-10 scheme can be applied in step S1690.

Meanwhile, when the M values are different from each other, an M value associated with the UL subframe of the PCell is determined in step S1630. The determination is for performing different channel selection according to the case-A, the case-B, the case-C, and the case-D. Further, a new TB/subframe and HARQ-ACK(j) mapping relation and a new bundling rule according to the number of M values are applied in step S1640. The embodiments described through FIG. 5, FIG. 6, FIG. 7, FIG. 8, FIG. 9, FIG. 10, FIG. 11, FIG. 12, FIG. 13 and FIG. 14, and Tables 6 to 13 are applied according to the number of M values. Further, a PUCCH resource induction method according to the new mapping relation is applied in step S1650, and PUCCH transmission on the uplink subframe of the PCell is performed by using the channel selection transmission method through the induced PUCCH resources in step S1660.

Figure 17:
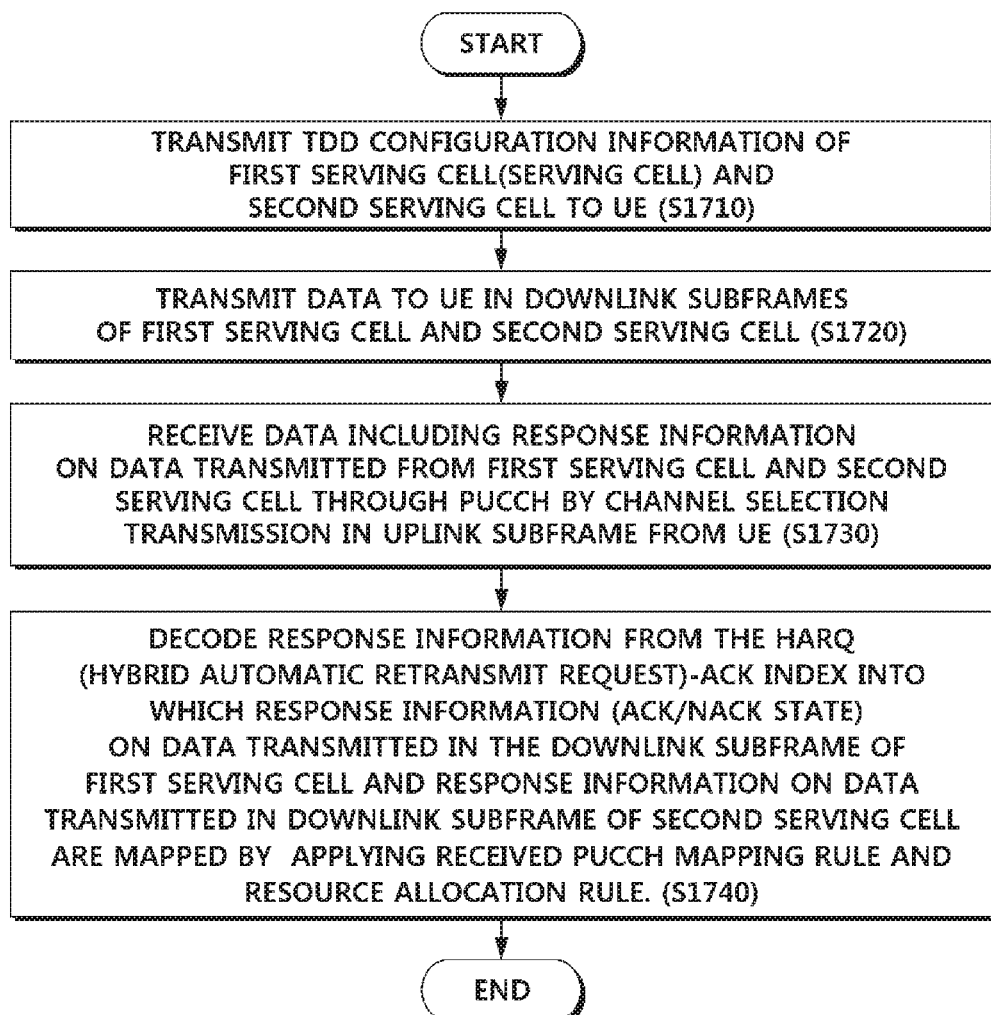
FIG. 17 is a diagram illustrating a process performed in a base station according to exemplary embodiments of the present invention.

FIG. 17 is a diagram illustrating a process performed in the eNB according to exemplary embodiments of the present invention.

The operation process of the eNB described through FIG. 12 will be described in more detail.

The eNB controls two or more bands having different TDD configurations. Also, the eNB controls HARQ-ACK index mapping and uplink resource allocation for channel selection transmission in the inter-band TDD transmission scheme.

The eNB transmits TDD configuration information of a first serving cell and a second serving cell to the UE in step S1710. Further, the eNB transmits data to the UE in downlink subframes of the first serving cell and the second serving cell in step S1720.

Thereafter, the eNB receives data including the response information on the data transmitted from the first serving cell and the second serving cell through the PUCCH by the channel selection transmission in the uplink subframe from the UE in step S1730. The eNB decodes the response information from the HARQ-ACK index into which the response information (ACK/NACK state) on the data transmitted in the downlink subframe of the first serving cell and the response information on the data transmitted in the downlink subframe of the second serving cell are mapped in step S1740 by applying the received PUCCH mapping rule and resource allocation rule.

Here, when the number of downlink subframes associated with the uplink subframe in which the PUCCH is transmitted is different between the first serving cell and the second serving cell, the mapping rule is determined according to the number of associated downlink subframes of the first serving cell and the second serving cell, and includes the mapping rule described in the embodiments of FIG. 5, FIG. 6, FIG. 7, FIG. 8, FIG. 9, FIG. 10, FIG. 11, FIG. 12, FIG. 13 and FIG. 14. The number of associated downlink subframes refers to M described above.

More specifically, as illustrated in FIG. 5 and FIG. 7, when the number of associated downlink subframes of the first serving cell is one of 2, 3, and 4 and the number of associated downlink subframes of the second serving cell is 1, two or three HARQ-ACK are mapped into the response information on the data downlinked from the first serving cell and one HARQ-ACK is mapped into the response information on the data downlinked from the second serving cell according to the mapping rule.

Further, in connection with the spatial bundling, when the downlinked data of the first cell or the second cell is two CWs, the response information of the first cell or the second cell is generated through the spatial bundling.

As illustrated in FIG. 6, two HARQ-ACK resources can be allocated in two CWs. That is, when the number of associated downlink subframes of the first cell is one of 2, 3, and 4, the number of associated downlink subframes of the second cell is 1, and the downlinked data of the second cell is two CWs, the response information on the data downlinked from the first cell is mapped into two HARQ-ACKs and the response information on the data downlinked from the second cell is mapped into two HARQ-ACKs according to mapping rule.

The time domain bundling described with reference to FIG. 8 and FIG. 9 is discussed. When the number of associated downlink subframes of the first cell is 3 or 4 and the number of associated downlink subframes of the second cell is one of 1, 2, and 3, the response information generated by performing the time domain bundling for the data downlinked from the first cell is mapped into two HARQ-ACKs and the response information on the data downlinked from the second cell is mapped into one or two HARQ-ACKs according to the mapping rule.

Further, the virtual time domain bundling described with reference to FIG. 9 can be applied. That is, when the number of associated downlink subframes of the first cell is 3 or 4 and the number of associated downlink subframes of the second cell is smaller than the number of associated downlink subframes of the first cell, the response information on the data downlinked from the second cell is generated by performing the time bundling for the virtual downlink subframe prearranged with the eNB and the data downlinked from the second cell, and then is mapped into two HARQ-ACK.

As illustrated in FIG. 10 and FIG. 12, when the number of associated downlink subframes of the first cell is 1 and there is no associated downlink subframe of the second cell, one or two HARQ-ACKs are mapped into the response information on the data downlinked from the first cell and there may be no mapping relation with respect to the second cell according to the mapping rule.

As illustrated in FIG. 11 and FIG. 13, when the number of associated downlink subframes of the first cell is 2 and there is no associated downlink subframe of the second cell, two or four HARQ-ACK are mapped into the response information on the data downlinked from the first cell and there is no mapping relation with respect to the second cell according to the mapping rule.

As illustrated in FIG. 14, when the number of associated downlink subframes of the first cell is larger than 2 and there is no associated downlink subframe of the second cell, two or four HARQ-ACKs are mapped into the response information on the data downlinked from the first cell and there is no mapping relation with respect to the second cell according to the mapping rule.

Meanwhile, the resource allocation rule for allocating PUCCH resources to include three or four HARQ-ACKs can use the implicit resource allocation method and the explicit resource allocation method. Two or more PUCCH resources are calculated through the implicit resource allocation method using information extracted when the PDCCH reception is performed in the downlink subframe of the PCell between the first cell or the second cell, and one or more PUCCH resources are calculated through the explicit resource allocation method by providing a TPC value within the DL DCI of the SCell between the first cell and the second cell.

The first cell and the second cell can be the PCell and the SCell, respectively, or inversely the first cell and the second cell can be the SCell and the PCell, respectively. The HARQ-ACK(j) index mapping in the embodiments of FIG. 5, FIG. 6, FIG. 7, FIG. 8 and FIG. 9, and Tables 6 to 11 are exemplary embodiments of the present invention. These embodiments can be variously implemented according to the configurations of the eNB and the UE in the index mapping and PUCCH resource allocation.

Figure 18:
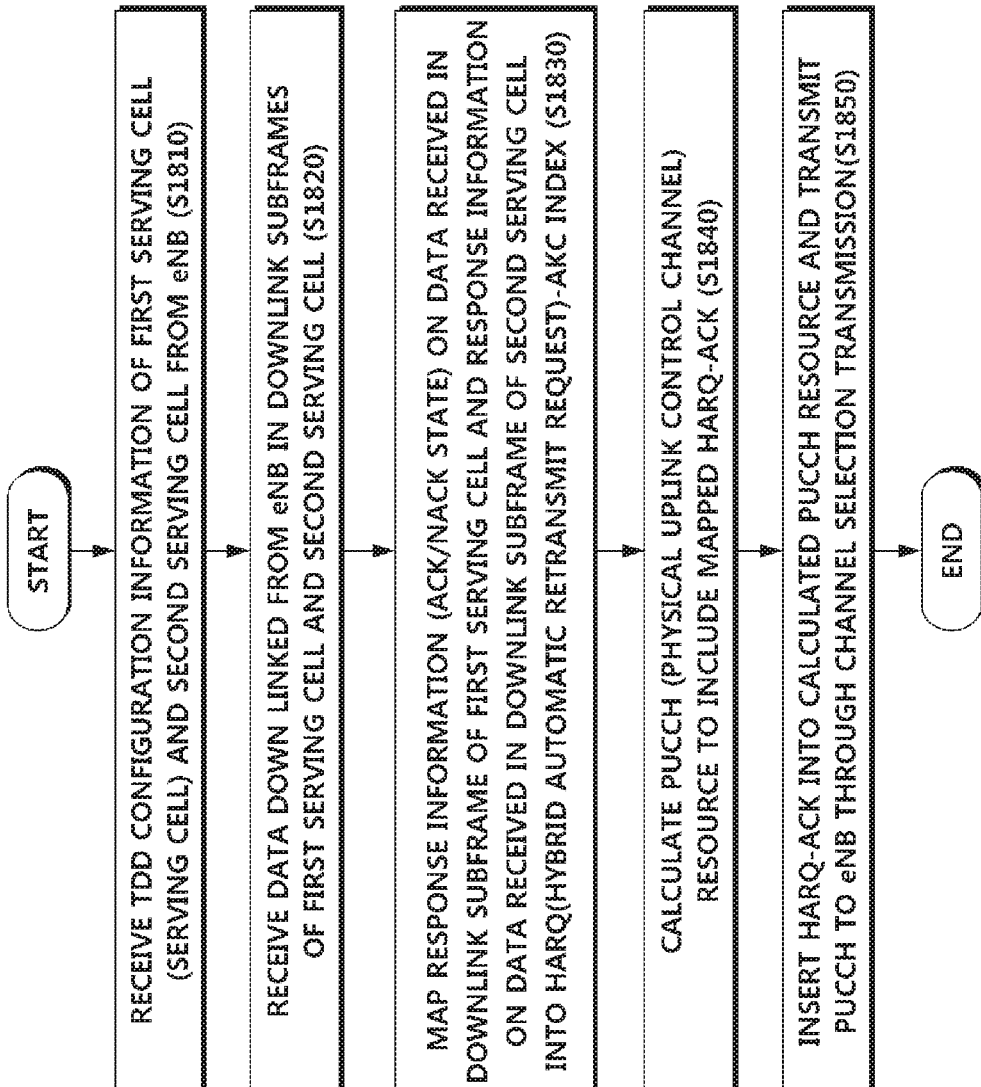
FIG. 18 is a diagram illustrating an operation process in a UE according to exemplary embodiments of the present invention.

FIG. 18 is a diagram illustrating an operation process in the UE according to exemplary embodiments of the present invention.

The UE is connected to the eNB controlling two or more bands having different TDD configurations. The UE performs the HARQ-ACK index mapping and the uplink resource allocation for channel selection transmission in the inter-band TDD transmission scheme.

The UE receives TDD configuration information of the first serving cell and the second serving cell from the eNB in step S1810. Also, the UE receives data downlinked in the downlink subframes of the first serving cell and the second serving cells from the eNB in step S1820.

The UE maps response information (ACK/NACK state) on data received in the downlink subframe of the first serving cell and response information on data received in the downlink subframe of the second serving cell into three or four HARQ-ACK indexes in step S1830. This process has been described with reference to FIG. 5, FIG. 6, FIG. 7, FIG. 8, FIG. 9, FIG. 10, FIG. 11, FIG. 12, FIG. 13 and FIG. 14.

Further, the UE calculates a resource of the Physical Uplink control CHannel (PUCCH) to include the mapped HARQ-ACK in step S1840, and inserts the three or four HARQ-ACKs into the calculated PUCCH resource and transmits the PUCCH to the eNB through the channel selection transmission in step S1850.

Here, the number of downlink subframes associated with the uplink subframe in which the PUCCH is transmitted is different between the first serving cell and the second serving cell, and the response information on the downlinked data and the HARQ-ACK index mapping are determined based on the number of associated downlink subframes of the first serving cell and the second serving cell.

More specifically, as illustrated in FIG. 5 and FIG. 7, when the number of associated downlink subframes of the first cell is one of 2, 3, and 4 and the number of associated downlink subframes of the second cell is 1, two or three HARQ-ACKs are mapped into the response information on the data downlinked from the first cell and one HARQ-ACK is mapped into the response information on the data downlinked from the second cell.

Further, in connection with the spatial bundling, when the downlinked data of the first cell or the second cell is two CWs, the response information of the first cell or the second cell is generated through the spatial bundling.

As illustrated in FIG. 6, two HARQ-ACK resources can be allocated in two CWs. When the number of associated downlink subframes of the first cell is one of 2, 3, and 4, the number of associated downlink subframes of the second cell is 1, and the downlinked data of the second cell is two CWs, two HARQ-ACKs are mapped into the response information on the data downlinked from the first cell and two HARQ-ACKs are mapped into the response information on the data downlinked from the second cell.

The time domain bundling described with reference to FIG. 8 and FIG. 9 will be discussed. When the number of associated downlink subframes of the first cell is 3 or 4 and the number of associated downlink subframes of the second cell is one of 1, 2, and 3, two HARQ-ACKs are mapped into the response information generated by performing the time domain bundling for the data downlinked from the first cell and one or two HARQ-ACKs are mapped into the response information on the data downlinked from the second cell.

Further, the virtual time domain bundling described with reference to through FIG. 9 can be applied. When the number of associated downlink subframes of the first cell is 3 or 4 and the number of associated downlink subframes of the second cell is smaller than the number of associated downlink subframes of the first cell, two HARQ-ACK are mapped into the response information generated by performing the time domain bundling for the virtual downlink subframe prearranged with the eNB and the data downlinked from the second cell.

As illustrated in FIG. 10 and FIG. 12, when the number of associated downlink subframes of the first cell is 1 and there is no associated downlink subframe of the second cell, one or two HARQ-ACKs are mapped into the response information on the data downlinked from the first cell and there may be no mapping relation with respect to the second cell according to the mapping rule.

As illustrated in FIG. 11 and FIG. 13, when the number of associated downlink subframes of the first cell is 2 and there is no associated downlink subframe of the second cell, two or four HARQ-ACKs are mapped into the response information on the data downlinked from the first cell and there is no mapping relation with respect to the second cell according to the mapping rule.

As illustrated in FIG. 14, when the number of associated downlink subframes of the first cell is larger than 2 and there is no associated downlink subframe of the second cell, two or four HARQ-ACKs are mapped into the response information on the data downlinked from the first cell and there is no mapping relation with respect to the second cell according to the mapping rule.

Meanwhile, the resource allocation rule for allocating PUCCH resources to include three or four HARQ-ACKs can use the implicit resource allocation method and the explicit resource allocation method. In calculating the PUCCH resources to include the mapped HARQ-ACK, two or more PUCCH resources are calculated through the implicit resource allocation method using information extracted when the PDCCH reception is performed in the downlink subframe of the PCell between the first cell or the second cell, and one or more PUCCH resources are calculated through the explicit resource allocation method by using a higher layer configuration from the eNB or a TPC value within the DL DCI of the SCell between the first cell and the second cell.

The first cell and the second cell can be the PCell and the SCell, respectively, or inversely the first cell and the second cell can be the SCell and the PCell, respectively. The HARQ-ACK(j) index mapping in the embodiments of FIG. 5, FIG. 6, FIG. 7, FIG. 8, FIG. 9, FIG. 10, FIG. 11, FIG. 12, FIG. 13 and FIG. 14 and Tables 6 to 14 are exemplary embodiments of the present invention. The present invention can be variously implemented according to the configurations of the eNB and the UE in the index mapping and PUCCH resource allocation.

Figure 19:
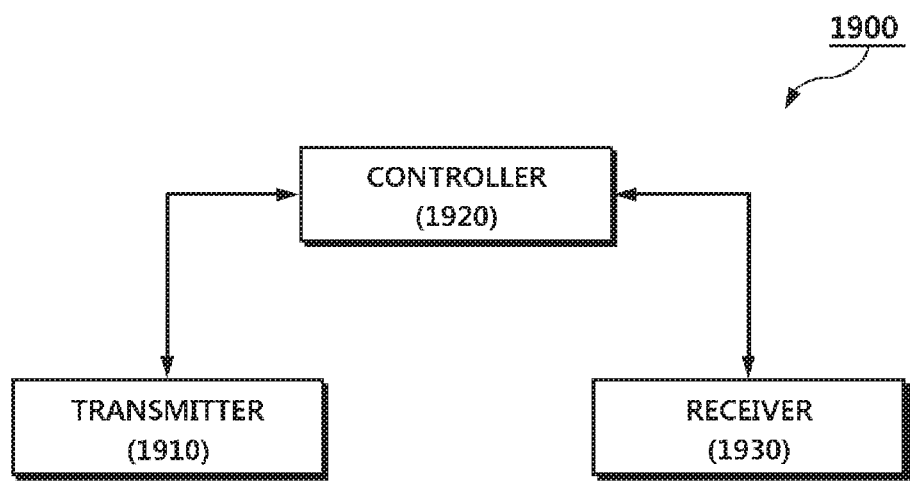
FIG. 19 is a diagram illustrating a configuration of a base station according to exemplary embodiments of the present invention.

FIG. 19 is a diagram illustrating a configuration of the eNB according to exemplary embodiments of the present invention.

An eNB 1900 controls two or more bands having different TDD configurations. Also, the eNB controls the HARQ-ACK index mapping and the uplink resource allocation for channel selection transmission in the inter-band TDD transmission scheme.

The eNB 1900 includes a transmitter 1910, a controller 1920, and a receiver 1930.

The transmitter 1910 transmits TDD configuration information of the first serving cell and the second serving cell to the IE, and transmits data to the UE in downlink subframes of the first serving cell and the second serving cell. The receiver 1430 receives data including the response information on the data transmitted from the first serving cell and the second serving cell through the PUCCH by the channel selection transmission in the uplink subframe from the UE.

The controller 1920 decodes the response information from three or four HARQ-ACK indexes into which the response information (ACK/NACK state) on the data transmitted in the downlink subframe of the first serving cell and the response information on the data transmitted in the downlink subframe of the second serving cell are mapped in step S1740 by applying the received PUCCH mapping rule and resource allocation rule.

Here, when the number of downlink subframes associated with the uplink subframe in which the PUCCH is transmitted is different between the first serving cell and the second serving cell, the mapping rule is determined according to the number of associated downlink subframes of the first serving cell and the second serving cell, and includes the mapping rule described in the embodiments of FIG. 5, FIG. 6, FIG. 7, FIG. 8 and FIG. 9.

More specifically, as illustrated in FIG. 5 and FIG. 7, when the number of associated downlink subframes of the first serving cell is one of 2, 3, and 4 and the number of associated downlink subframes of the second serving cell is 1, two or three HARQ-ACKs are mapped into the response information on the data downlinked from the first serving cell and one HARQ-ACK is mapped into the response information on the data downlinked from the second serving cell according to the mapping rule.

Further, in connection with the spatial bundling, when the downlinked data of the first cell or the second cell is two CWs, the response information of the first cell or the second cell is generated through the spatial bundling.

As illustrated in FIG. 6, two HARQ-ACK resources can be allocated in two CWs. That is, when the number of associated downlink subframes of the first cell is one of 2, 3, and 4, the number of associated downlink subframes of the second cell is 1, and the downlinked data of the second cell is two CWs, the response information on the data downlinked from the first cell is mapped into two HARQ-ACKs and the response information on the data downlinked from the second cell is mapped into two HARQ-ACKs according to mapping rule.

The time domain bundling described through FIG. 8 and FIG. 9 is discussed. When the number of associated downlink subframes of the first cell is 3 or 4 and the number of associated downlink subframes of the second cell is one of 1, 2, and 3, the response information generated by performing the time domain bundling for the data downlinked from the first cell is mapped into two HARQ-ACKs and the response information on the data downlinked from the second cell is mapped into one or two HARQ-ACKs according to the mapping rule.

Further, the virtual time domain bundling described through FIG. 9 can be applied. That is, when the number of associated downlink subframes of the first cell is 3 or 4 and the number of associated downlink subframes of the second cell is smaller than the number of associated downlink subframes of the first cell, the response information on the data downlinked from the second cell is generated by performing the time bundling for the virtual downlink subframe prearranged with the eNB and the data downlinked from the second cell and then is mapped into two HARQ-ACKs.

As illustrated in FIG. 10 and FIG. 12, when the number of associated downlink subframes of the first cell is 1 and there is no associated downlink subframe of the second cell, one or two HARQ-ACKs are mapped into the response information on the data downlinked from the first cell and there may be no mapping relation with respect to the second cell according to the mapping rule.

As illustrated in FIG. 11 and FIG. 13, when the number of associated downlink subframes of the first cell is 2 and there is no associated downlink subframe of the second cell, two or four HARQ-ACKs are mapped into the response information on the data downlinked from the first cell and there is no mapping relation with respect to the second cell according to the mapping rule.

As illustrated in FIG. 14, when the number of associated downlink subframes of the first cell is larger than 2 and there is no associated downlink subframe of the second cell, two or four HARQ-ACKs are mapped into the response information on the data downlinked from the first cell and there is no mapping relation with respect to the second cell according to the mapping rule.

Meanwhile, the resource allocation rule for allocating PUCCH resources to include three or four HARQ-ACKs can use the implicit resource allocation method and the explicit resource allocation method. Two or more PUCCH resources are calculated through the implicit resource allocation method using information extracted when the PDCCH reception is performed in the downlink subframe of the PCell between the first cell or the second cell, and one or more PUCCH resources are calculated through the explicit resource allocation method by providing a TPC value within the DL DCI of the SCell between the first cell and the second cell.

The first cell and the second cell can be the PCell and the SCell, respectively, or inversely the first cell and the second cell can be the SCell and the PCell, respectively.

The HARQ-ACK(j) index mapping in the exemplary embodiments of FIG. 5, FIG. 6, FIG. 7, FIG. 8, FIG. 9, FIG. 10, FIG. 11, FIG. 12, FIG. 13 and FIG. 14, and Tables 6 to 14 are exemplary embodiments of the present invention. The present invention can be variously implemented according to the configurations of the eNB and the UE in the index mapping and PUCCH resource allocation.

Figure 20:
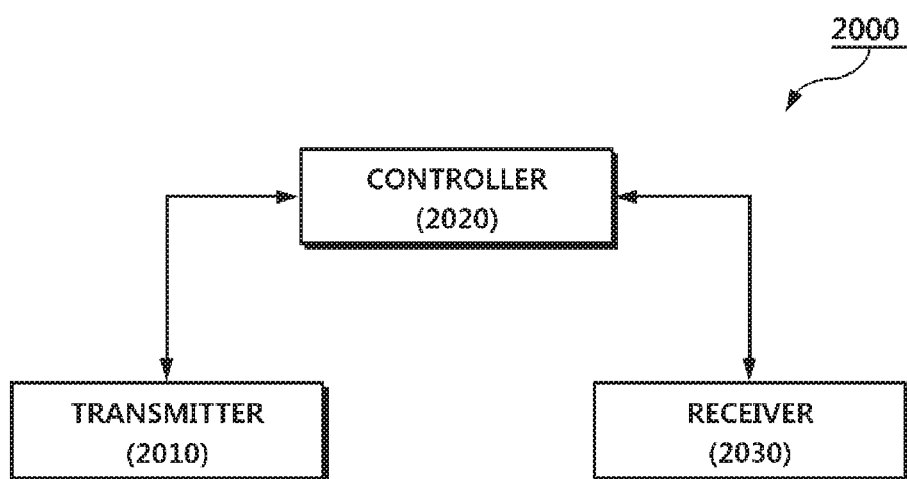
FIG. 20 is a diagram illustrating a configuration of a UE according to exemplary embodiments of the present invention.

FIG. 20 is a diagram illustrating a configuration of the U according to exemplary embodiments of the present invention.

A UE 2000 is connected to the eNB controlling two or more bands having different TDD configurations. The UE performs the HARQ-ACK index mapping and the uplink resource allocation for channel selection transmission in the inter-band TDD transmission scheme.

The UE 2000 includes a transmitter 2010, a controller 2020, and a receiver 2030.

The receiver 2030 receives TDD configuration information of the first serving cell and the second serving cell from the eNB, and receives data downlinked in the downlink subframes of the first serving cell and the second serving cells from the eNB.

The controller 2020 maps response information (ACK/NACK state) on data received in the downlink subframe of the first serving cell and response information on data received in the downlink subframe of the second serving cell into three or four HARQ-ACK indexes. Further, controller 2020 calculates a resource of the PUCCH to include the mapped HARQ-ACK and inserts three or four HARQ-ACKs into the calculated PUCCH resource.

Further, the transmitter 2010 transmits the PUCCH to the eNB through the channel selection transmission.

Here, the number of downlink subframes associated with the uplink subframe in which the PUCCH is transmitted is different between the first serving cell and the second serving cell, and the response information on the downlinked data and the HARQ-ACK index mapping are determined based on the number of associated downlink subframes of the first serving cell and the second serving cell.

More specifically, as illustrated in FIG. 5 and FIG. 7, when the number of associated downlink subframes of the first cell is one of 2, 3, and 4 and the number of associated downlink subframes of the second cell is 1, two or three HARQ-ACKs are mapped into the response information on the data downlinked from the first cell and one HARQ-ACK is mapped into the response information on the data downlinked from the second cell.

Further, in connection with the spatial bundling, when the downlinked data of the first cell or the second cell is two CWs, the response information of the first cell or the second cell is generated through the spatial bundling.

As illustrated in FIG. 6, two HARQ-ACK resources can be allocated in two CWs. When the number of associated downlink subframes of the first cell is one of 2, 3, and 4, the number of associated downlink subframes of the second cell is 1, and the downlinked data of the second cell is two CWs, two HARQ-ACKs are mapped into the response information on the data downlinked from the first cell and two HARQ-ACKs are mapped into the response information on the data downlinked from the second cell.

The time domain bundling described through FIG. 8 and FIG. 9 will be discussed. When the number of associated downlink subframes of the first cell is 3 or 4 and the number of associated downlink subframes of the second cell is one of 1, 2, and 3, two HARQ-ACKs are mapped into the response information generated by performing the time domain bundling for the data downlinked from the first cell and one or two HARQ-ACKs are mapped into the response information on the data downlinked from the second cell.

Further, the virtual time domain bundling described through FIG. 9 can be applied. When the number of associated downlink subframes of the first cell is 3 or 4 and the number of associated downlink subframes of the second cell is smaller than the number of associated downlink subframes of the first cell, two HARQ-ACKs are mapped into the response information generated by performing the time domain bundling for the virtual downlink subframe prearranged with the eNB and the data downlinked from the second cell.

As illustrated in FIG. 10 and FIG. 12, when the number of associated downlink subframes of the first cell is 1 and there is no associated downlink subframe of the second cell, one or two HARQ-ACKs are mapped into the response information on the data downlinked from the first cell and there may be no mapping relation with respect to the second cell according to the mapping rule.

As illustrated in FIG. 11 and FIG. 13, when the number of associated downlink subframes of the first cell is 2 and there is no associated downlink subframe of the second cell, two or four HARQ-ACKs are mapped into the response information on the data downlinked from the first cell and there is no mapping relation with respect to the second cell according to the mapping rule.

As illustrated in FIG. 14, when the number of associated downlink subframes of the first cell is larger than 2 and there is no associated downlink subframe of the second cell, two or four HARQ-ACKs are mapped into the response information on the data downlinked from the first cell and there is no mapping relation with respect to the second cell according to the mapping rule.

Meanwhile, the resource allocation rule for allocating PUCCH resources to include three or four HARQ-ACKs can use the implicit resource allocation method and the explicit resource allocation method. In calculating the PUCCH resources to include the mapped HARQ-ACK, two or more PUCCH resources are calculated through the implicit resource allocation method using information extracted when the PDCCH reception is performed in the downlink subframe of the PCell between the first cell or the second cell, and one or more PUCCH resources are calculated through the explicit resource allocation method by using a higher layer configuration from the eNB or a TPC value within the DL DCI of the SCell between the first cell and the second cell.

The first cell and the second cell can be the PCell and the SCell, respectively, or inversely the first cell and the second cell can be the SCell and the PCell, respectively.

The HARQ-ACK(j) index mapping in the exemplary embodiments of FIG. 5, FIG. 6, FIG. 7, FIG. 8, FIG. 9, FIG. 10, FIG. 11, FIG. 12, FIG. 13 and FIG. 14, and Tables 6 to 14 are exemplary embodiments of the present invention. The embodiments can be variously implemented according to the configurations of the eNB and the UE in the index mapping and PUCCH resource allocation.

When the methods provided by the exemplary embodiments is applied, it is possible to improve the transmission efficiency by solving the PUCCH transmission method problem generated due to different PDSCH HARQ timings in the LTE Rel-11 inter-band A TDD system.

Unlink the conventional same TDD UL-DL configuration among all UEs allowing CA, these embodiments may allow PUCCH A/N transmission when the PCell and the SCell have different PDSCH HARQ timings in a state where different TDD UL-DL configurations are possible when CCs are aggregated on different bands.

As disclosed, it may be possible to support a more stable and improved channel selection transmission method in an inter-band condition where different TDD configurations are made.

The embodiments of the present invention are merely for describing the technical idea of the present invention, but various modifications and changes can be made by those skilled in the art without departing from essential characteristics of the present invention. Accordingly, the embodiments disclosed in the present invention do not limit but describe the technical idea of the present invention, and the scope of the technical idea of the present invention is not limited by the embodiments. The protection range of the present invention should be construed by the appended claims and all technical ideas within an equivalent range thereof should be construed as being included in the scope of the present invention.

While the exemplary embodiments have been shown and described, it will be understood by those skilled in the art that various changes in form and details may be made thereto without departing from the spirit and scope of this disclosure as defined by the appended claims and their equivalents. Thus, as long as modifications fall within the scope of the appended claims and their equivalents, they should not be misconstrued as a departure from the scope of the invention itself.

What is claimed is:

1. A method for transmitting hybrid automatic repeat request-acknowledgment (HARQ-ACK) information to a base station (BS) by a user equipment, the method comprising:
receiving, from the BS, data through at least one of a first set of downlink subframe(s) on a primary cell (PCell) and a second set of downlink subframe(s) on a secondary cell (SCell), wherein both of the first set of downlink subframe(s) and the second set of downlink subframe(s) are associated with an uplink subframe;
determining a first set of HARQ-ACK information for the PCell and a second set of HARQ-ACK information for the SCell, wherein at least N pieces of HARQ-ACK information of the first set of HARQ-ACK information or the second set of HARQ-ACK information are set to discontinuous transmission (DTX) based on a difference between the number of downlink subframe(s) in the first set of downlink subframe(s) and the number of downlink subframe(s) in the second set of downlink subframe(s);
generating a HARQ-ACK response, responsive to data transmitted from the BS, based on the first and second set of HARQ-ACK information; and
transmitting the HARQ-ACK response to the BS through the uplink subframe.

2. The method of claim 1, wherein the N pieces of HARQ-ACK information set to DTX are for a cell, among the PCell and the SCell, having the smaller number of downlink subframe(s) associated with the uplink subframe.

3. The method of claim 2, wherein the HARQ-ACK response is transmitted through a physical uplink control channel (PUCCH) resource in the uplink subframe based on channel selection information, and
wherein the channel selection information is determined based on a combination of the first HARQ-ACK information for the PCell and the second HARQ-ACK information for the SCell.

4. The method of claim 1, further comprising:
identifying the number KPCell of downlink subframe(s) in the first set of downlink subframe(s) based on an uplink-downlink configuration of the PCell;
identifying the number KSCell of downlink subframe(s) in the second set of downlink subframe(s) based on an uplink-downlink configuration of the SCell; and
determining the number N based on the difference between the KPCell and the KSCell.

5. The method of claim 1, wherein the HARQ-ACK response is generated based on the N pieces of HARQ-ACK information set to DTX and response information on the data transmitted from the BS.

6. A user equipment for transmitting hybrid automatic repeat request-acknowledgment (HARQ-ACK) information to a base station (BS), the user equipment comprising:
a receiver configured to receive, from the BS, data through at least one of a first set of downlink subframe(s) on a primary cell (PCell) and a second set of downlink subframe(s) on a secondary cell (SCell), wherein both of the first set of downlink subframe(s) and the second set of downlink subframe(s) are associated with an uplink subframe;
a controller configured to:
determine a first set of HARQ-ACK information for the PCell and a second set of HARQ-ACK information for the SCell, wherein at least N pieces of HARQ-ACK information of the first set of HARQ-ACK information or the second set of HARQ-ACK information are set to discontinuous transmission (DTX) based on a difference between the number of downlink subframe(s) in the first set of downlink subframe(s) and the number of downlink subframe(s) in the second set of downlink subframe(s), and
generate a HARQ-ACK response, responsive to data transmitted from the BS, based on the first and second set of HARQ-ACK information; and
a transmitter configured to transmit the HARQ-ACK response to the BS through the uplink subframe.

7. The user equipment of claim 6, wherein the N pieces of HARQ-ACK information set to DTX are for a cell, among the PCell and the SCell, having the smaller number of downlink subframe(s) associated with the uplink subframe.

8. The user equipment of claim 7, wherein the HARQ-ACK response is transmitted through a physical uplink control channel (PUCCH) resource in the uplink subframe based on channel selection information, and wherein the channel selection information is determined based on a combination of the first HARQ-ACK information for the PCell and the second HARQ-ACK information for the SCell.

9. The user equipment of claim 6, the controller is further configured to:
identify the number KPCell of downlink subframe(s) in the first set of downlink subframe(s) based on an uplink-downlink configuration of the PCell;
identify the number KSCell of downlink subframe(s) in the second set of downlink subframe(s) based on an uplink-downlink configuration of the SCell; and
determine the number N based on the difference between the KPCell and the KSCell.

10. The user equipment of claim 6, wherein the HARQ-ACK response is generated based on the N pieces of HARQ-ACK information set to DTX and response information on the data transmitted from the BS.

11. A method of receiving hybrid automatic repeat request-acknowledgment (HARQ-ACK) information from a user equipment (UE) by a base station (BS), the method comprising:
transmitting data to the UE through at least one of a first set of downlink subframe(s) on a primary cell (PCell) and a second set of downlink subframe(s) on a secondary cell (SCell), wherein both of the first set of downlink subframe(s) and the second set of downlink subframe(s) are associated with an uplink subframe;
receiving a HARQ-ACK response generated by the UE through an uplink subframe, wherein the HARQ-ACK response is responsive to the data transmitted to the UE and generated based on a first set of HARQ-ACK information for the PCell and a second set of HARQ-ACK information for the SCell;
identifying the number KPCell of downlink subframe(s) in the first set of downlink subframe(s) based on an uplink-downlink configuration of the PCell;
identifying the number KSCell of downlink subframe(s) in the second set of downlink subframe(s) based on an uplink-downlink configuration of the SCell;
determining the number N of a difference between the KPCell and the KSCell; and
identifying N pieces of discontinuous transmission (DTX) of the first set of HARQ-ACK information or the second set of HARQ-ACK information as HARQ-ACK information corresponding to the difference between the KPCell and the KSCell.

12. The method of claim 11, wherein the N pieces of DTX are identified as HARQ-ACK information for a cell, among the PCell and the SCell, having the smaller number of downlink subframe(s) associated with the uplink subframe.

13. The method of claim 12, wherein the HARQ-ACK response is received through a physical uplink control channel (PUCCH) resource in the uplink subframe based on channel selection information, and wherein the channel selection information is determined based on a combination of the HARQ-ACK information for the PCell and the HARQ-ACK information for the SCell.

14. The method of claim 11, wherein the HARQ-ACK response is generated based on the N pieces of DTX and response information on the data transmitted from the BS.

15. A base station (BS) of receiving hybrid automatic repeat request-acknowledgment (HARQ-ACK) information from a user equipment (UE), the base station comprising:
a transmitter configured to transmit data to the UE through at least one of a first set of downlink subframe(s) on a primary cell (PCell) and a second set of downlink subframe(s) on a secondary cell (SCell), wherein both of the first set of downlink subframe(s) and the second set of downlink subframe(s) are associated with an uplink subframe;
a receiver configured to receive a HARQ-ACK response generated by the UE through an uplink subframe, wherein the HARQ-ACK response is responsive to the data transmitted to the UE and generated based on a first set of HARQ-ACK information for the PCell and a second set of HARQ-ACK information for the SCell; and
a controller configured to:
identify the number KPCell of downlink subframe(s) in the first set of downlink subframe(s) based on an uplink-downlink configuration of the PCell,
identify the number KSCell of downlink subframe(s) in the second set of downlink subframe(s) based on an uplink-downlink configuration of the SCell,
determine the number N of a difference between the KPCell and the KSCell, and
identify N pieces of discontinuous transmission (DTX) of the first set of HARQ-ACK information or the second set of HARQ-ACK information as HARQ-ACK information corresponding to the difference between the KPCell and the KSCell.

16. The base station of claim 15, wherein the controller identifies the N pieces of DTX as HARQ-ACK information for a cell, among the PCell and the SCell, having the smaller number of downlink subframe(s) associated with the uplink subframe.

17. The base station of claim 16, wherein the HARQ-ACK response is received through a physical uplink control channel (PUCCH) resource in the uplink subframe based on channel selection information, and wherein the channel selection information is determined based on a combination of the HARQ-ACK information for the PCell and the HARQ-ACK information for the SCell.

18. The base station of claim 15, wherein the HARQ-ACK response is generated based on the N pieces of DTX and response information on the data transmitted from the BS.

* * * * *